United States Patent
Giri et al.

(10) Patent No.: US 12,371,444 B2
(45) Date of Patent: Jul. 29, 2025

(54) METHODS OF MAKING MOFS, SYSTEMS FOR SYNTHESIZING MOFS, AND METHODS OF COATING TEXTILES WITH MOFS

(71) Applicant: UNIVERSITY OF VIRGINIA PATENT FOUNDATION, Charlottesville, VA (US)

(72) Inventors: Gaurav Giri, Charlottesville, VA (US); Luke Huelsenbeck, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 814 days.

(21) Appl. No.: 17/261,248

(22) PCT Filed: Jul. 19, 2019

(86) PCT No.: PCT/US2019/042586
§ 371 (c)(1),
(2) Date: Jan. 19, 2021

(87) PCT Pub. No.: WO2020/018897
PCT Pub. Date: Jan. 23, 2020

(65) Prior Publication Data
US 2021/0269462 A1   Sep. 2, 2021

Related U.S. Application Data

(60) Provisional application No. 62/700,576, filed on Jul. 19, 2018.

(51) Int. Cl.
C07F 7/00 (2006.01)
C07F 1/08 (2006.01)
(Continued)

(52) U.S. Cl.
CPC ............... *C07F 7/003* (2013.01); *C07F 1/08* (2013.01); *C07F 3/06* (2013.01); *D06M 13/50* (2013.01)

(58) Field of Classification Search
CPC .................................................... C07C 51/418
See application file for complete search history.

(56) References Cited

U.S. PATENT DOCUMENTS

2018/0273568 A1*   9/2018   Fröhlich ................. C07F 5/069

OTHER PUBLICATIONS

R. Seetharaj, P.V. Vandana, P. Arya, S. Mathew, Dependence of solvents, pH, molar ratio and temperature in tuning metal organic framework architecture, Arabian Journal of Chemistry, available online Jan. 2016 vol. 12, Issue 3, pp. 295-315, (Year: 2019).*

(Continued)

*Primary Examiner* — Alex A Rolland
(74) *Attorney, Agent, or Firm* — Dinsmore & Shohl LLP

(57) ABSTRACT

A method of synthesis of metal organic frameworks ("MOFs") includes preparing a metal solution by dissolving at least one metal salt in an aqueous solution and buffering the metal solution with a base to achieve a first pH, the metal solution optionally comprising an organic co-solvent, preparing a linker solution by adding at least one organic acid linker and at least one base to an aqueous solution, and mixing the metal solution and the linker solution to produce the MOFs. The at least one organic acid linker has an ability to be protonated or deprotonated in response to a second pH, and the mixture of the metal solution and the linker solution has a third pH value, where the third pH value is greater than a highest $pK_a$ of the organic acid linker. The MOFs may be applied to a textile.

17 Claims, 31 Drawing Sheets

(51) Int. Cl.
*C07F 3/06* (2006.01)
*D06M 13/50* (2006.01)

(56) References Cited

OTHER PUBLICATIONS

Da Silva Pinto, M., Sierra-Avila, C.A. & Hinestroza, J.P. In situ synthesis of a Cu-BTC metal-organic framework (MOF 199) onto cellulosic fibrous substrates: cotton. Cellulose 19, 1771-1779. (Year: 2012).*

Basics Of pH Control (Year: 2011).*

Examination Report dated Aug. 30, 2022 in related Indian Application No. 202117004512 filed Jul. 19, 2019.

Yu M et al.: "Covalent immobilization of metal-organic frameworks onto the surface of nylon—a new approach to the functionalization and coloration of textiles", 2016, Scientific Reports, URL: https://www.nature.com/articles/srep22796.pdf.

International Search Report and Written Opinion dated Oct. 4, 2019 in related International Application No. PCT/US2019/042586.

Manuel Sanchez-Sanchez et al, "Synthesis of metal-organic frameworks in water at room temperature: salts as linker sources", Green Chemistry, vol. 17, No. 3, Jan. 1, 2015 (Jan. 1, 2015), p. 1500-1509.

Jin-Liang Zhuang et al, "Rapid Room-Temperature Synthesis of Metal-Organic Framework HKUST-1 Crystals in Bulk and as Oriented and Patterned Thin Films", Advanced Functional Materials, vol. 21, No. 8, Apr. 22, 2011 (Apr. 22, 2011), p. 1442-1447.

R. Seetharaj et al, "Dependence of solvents, pH, molar ratio and temperature in tuning metal organic framework architecture", Arabian Journal of Chemistry, vol. 12, No. 3, Jan. 21, 2016 (Jan. 21, 2016), p. 295-315.

Min-Kun Kim et al., "Degradation of chemical warfare agents over cotton fabric functionalized with UIP-66-NH2", RSC Advances, vol. 8, Dec. 12, 2018, p. 41633-38.

Huelsenbeck, et al., "Generalized Approach for Rapid Aqueous MOF Synthesis by Controlling Solution pH", Cryst. Growth Des. 2020, 20, pp. 6787-6795.

* cited by examiner

METHODS OF MAKING MOFS, SYSTEMS FOR SYNTHESIZING MOFS, AND METHODS OF COATING TEXTILES WITH MOFS

CROSS-REFERENCE TO RELATED APPLICATION

This application is a National Phase Entry under 35 U.S.C. § 371 of International Application No. PCT/US2019/042586, filed on Jul. 19, 2019, and claims the benefit of U.S. Provisional Application No. 62/700,576 filed on Jul. 19, 2018, the entire content of which is incorporated herein by reference.

TECHNICAL FIELD

Embodiments of the present disclosure are generally related to metal organic frameworks, and are more particularly related to methods of synthesizing metal organic frameworks and methods of coating textiles therewith.

BACKGROUND

Metal organic frameworks (MOFs) are composed of metal ions or oxo-metallic secondary building units coordinated with organic linkers. The rational selection of these components allows for the design of pore size and chemistry as well as the surface properties of the materials. Generally, therefore, MOFs have high porosity and tunable pore aperture. MOFs are often used in catalysis, separations, sensing, gas storage, and medicine.

Despite widespread adoption of MOFs for a wide variety of applications, traditional synthetic methods used for obtaining these materials require long timespans, e.g., on the order of minutes to hours. Such slow formation presents significant challenges for industrial scale production efforts. Additionally, many of the traditional methods involve the use of harsh organic solvents and/or high temperatures for these long periods of time. See, e.g., Kim et al., *RSC Adv.*, 2018, 8, 41633-38 (forming the MOF UiO-66 (NH$_2$) on mercerized cotton by heating at 80° C. for 24 hours). See also Rubin et al., *ACS Appl. Mater. Interfaces*, 2018, 10, 17. 15189-99 (forming the MOF HKUST-1 (NH$_2$) using dimethylacetamide solvent with 15 repetitions of 17-minute soakings in two different solutions for a total of 30 different layers). See also Park et al., *Nanoscale*, 2017, 9, 12850-54 (forming the MOF ZIF-8 at room temperature for 12 hours).

Accordingly, there remains a need for enhanced methods of synthesizing MOFs, enhanced methods of coating textiles with MOFs, and systems used for synthesizing MOFs.

SUMMARY

The present methods meet these needs by providing MOFs that can be synthesized rapidly, i.e., on the order of seconds, rather than the minutes or hours required using conventional synthetic techniques.

According to at least one aspect of the present disclosure, a method of synthesis of MOFs includes preparing a metal solution by dissolving at least one metal salt in an aqueous solution and buffering the metal solution with a base to achieve a first pH, the metal solution optionally comprising an organic co-solvent, preparing a linker solution by adding at least one organic acid linker and at least one base to an aqueous solution, and mixing the metal solution and the linker solution to produce the MOFs. The at least one organic acid linker has an ability to be protonated or deprotonated in response to a second pH, and the mixture of the metal solution and the linker solution has a third pH value, where the third pH value is greater than a highest pK$_a$ of the organic acid linker.

According to another aspect of the present disclosure, which may include any of the foregoing aspects, the at least one metal salt is selected from the group consisting of ZrOCl$_{12}$, ZrCl$_4$, ZrBr$_4$, ZrI$_4$, ZrO(NO$_3$)$_2$, Zr(ClO$_4$)$_4$ Zr(SO$_4$)$_2$, Zr(PO$_4$)$_4$ ZrO(CH$_3$COO)$_2$, Zr(C$_6$H$_5$O$_7$) ("Zirconium citrate"), Zr(CH$_2$C(CH$_3$)CO$_2$)$_4$ ("Zirconium methacrylate"), Zr(CH$_2$CHCO$_2$)$_4$ ("Zirconium acrylate"), Zr(OC$_4$H$_9$)$_4$ ("Zirconium tertbutoxide"), Zr(OCH$_2$CH$_2$CH$_3$)$_4$ ("Zirconium (IV) propoxide"), Zr$_6$O$_4$ (OH)+ (CH$_2$C(CH$_3$)CO$_2$)$_{12}$ ("Zirconium (IV) oxo hydroxy methacrylate"), Cu(NO$_3$)$_2$, CuCl, CuCl$_2$, CuBr, CuBr$_2$, CuI, CuI$_2$, Cu(ClO$_4$)$_2$, CuSO$_4$, Cu$_3$(PO$_4$)$_2$Cu(CH$_3$COO), Cu$_3$(C$_6$H$_5$O$_7$)$_2$ ("Copper citrate"), Cu(CH$_2$C(CH$_3$)CO$_2$)$_2$ ("Copper methacrylate"), Cu(CH$_2$CHCO$_2$)$_2$ ("Copper acrylate"), Cu((CH$_3$)$_2$CHO)$_2$ ("Copper propoxide"), Zn(NO$_3$)$_2$, ZnCl$_2$, ZnBr$_2$, ZnI$_2$, Zn(ClO$_4$)$_2$, ZnSO$_4$, Zn$_3$(PO$_4$)$_2$, Zn(CH$_3$COO), Zn$_3$(C$_6$H$_5$O$_7$)$_2$ ("Zinc citrate"), Zn(CH$_2$C(CH$_3$)CO$_2$)$_2$ ("Zinc methacrylate"), Zn(CH$_2$CHCO$_2$)$_2$ ("Zinc acrylate"), Zn(OCH$_2$CH$_2$CH$_3$)$_2$ ("Zinc propoxide"), AlCl$_3$, AlBr$_3$, AlI$_3$, Al(NO$_3$)$_3$, Al(ClO$_4$)$_3$, Al$_2$(SO$_4$)$_3$, AlPO$_4$, Al(CH$_3$COO)$_3$, Al(C$_6$H$_5$O$_7$) ("Aluminum citrate"), Al(CH$_2$C(CH$_3$)CO$_2$)$_3$ ("Aluminum methacrylate"), Al(CH$_2$CHCO$_2$)$_3$ ("Aluminum acrylate"), Al((CH$_3$)$_2$CHO)$_3$ ("Aluminum propoxide"), FeCl$_2$, FeCl$_3$, FeBr$_3$, FeI$_2$, Fe(NO$_3$)$_2$, FeSO$_4$, Fez (SO$_4$)$_3$, FePO$_4$, Fe(ClO$_4$)$_2$, Fe(CH$_3$COO)$_2$, Fe(C$_6$H$_5$O$_7$) ("Iron citrate"), Fe(CH$_2$C(CH$_3$)CO$_2$)$_3$ ("Iron methacrylate"), Fe(CH$_2$CHCO$_2$)$_3$ ("Iron acrylate"), Fe((CH$_3$)$_2$CHO)$_3$ ("Iron propoxide"), TiCl$_2$, TiCl$_3$, TiCl$_4$, TiBr$_4$, TiI$_4$ Ti(NO$_3$)$_4$, Ti(ClO$_4$)$_4$, Ti(SO$_4$)$_2$, Ti$_3$(PO$_4$)$_4$, Ti(CH$_3$COO)$_4$, Ti(C$_6$H$_5$O$_7$) ("Titanium citrate"), Ti(CH$_2$C(CH$_3$)CO$_2$)$_4$ ("Titanium methacrylate"), Ti(CH$_2$CHCO$_2$)$_4$ ("Titanium acrylate"), Ti((CH$_3$)$_2$CHO)$_4$ ("Titanium propoxide"), MgCl$_2$, MgBr$_2$, MgI$_2$, Mg(NO$_3$)$_2$, Mg(SO$_4$), Mg(PO$_4$)$_2$, Mg(ClO$_4$)$_2$, Mg(CH$_3$COO)$_2$, Mg(C$_6$H$_5$O$_7$) ("Magnesium citrate"), Mg(CH$_2$C(CH$_3$)CO$_2$)$_2$ ("Magnesium methacrylate"), Mg(CH$_2$CHCO$_2$)$_2$ ("Magnesium acrylate"), Mg((CH$_3$)$_2$CHO)$_2$ ("Magnesium propoxide"), HfCl$_4$, HfBr$_4$, HfI$_4$, Hf(NO$_3$)$_4$, Hf(SO$_4$)$_2$, Hf$_3$(PO$_4$)$_4$, Hf(CH$_3$COO)$_4$, Hf(C$_6$H$_5$O$_7$) ("Hafnium citrate"), Hf(CH$_2$C(CH$_3$)CO$_2$)$_4$ ("Hafnium methacrylate"), Hf(CH$_2$CHCO$_2$)$_4$ ("Hafnium acrylate"), Hf((CH$_3$)$_2$CHO)$_4$ ("Hafnium propoxide"), CoCl$_2$, CoCl$_3$, CoBr$_2$, CoI$_2$, Co(NO$_3$)$_2$, Co(ClO$_4$)$_2$, Co(SO$_4$), Co(CH$_3$COO), Co(CH$_2$C(CH$_3$)CO$_2$)$_2$ ("Cobalt methacrylate"), Co(CH$_2$CHCO$_2$)$_2$ ("Cobalt acrylate"), and Co((CH$_3$)$_2$CHO)$_2$ ("Cobalt propoxide").

According to another aspect of the present disclosure, which may include any of the foregoing aspects, the at least one metal salt is ZrOCl$_2$.

According to another aspect of the present disclosure, which may include any of the foregoing aspects, the organic acid linker is selected from the group consisting of a substituted or unsubstituted, straight-chain or branched dicarboxylic acid having at least three carbon atoms and saturated and/or unsaturated C—C bonds, formula (I), formula (II), formula (III), and any combination thereof.

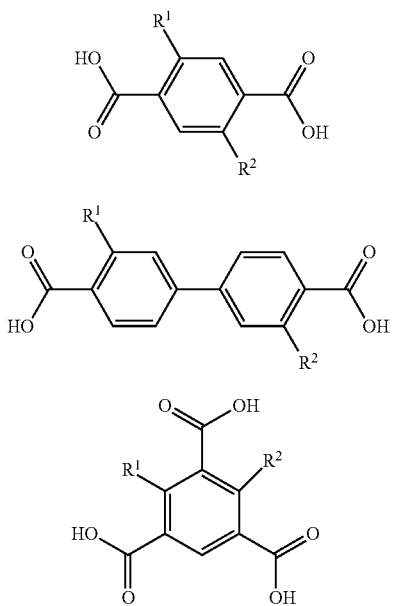

R[1] and R[2] are the same or different and are selected from the group consisting of hydrogen, amino, sulfo, hydroxo, carboxyl, methyl, ethyl, propyl, butyl, pentyl, hexyl, heptyl, octyl, nonyl, phosphono, trifluoromethyl, trichloromethyl, and tribromomethyl.

According to another aspect of the present disclosure, which may include any of the foregoing aspects, the organic acid linker is selected from the group consisting of formula (IV), formula (V), and any combination thereof.

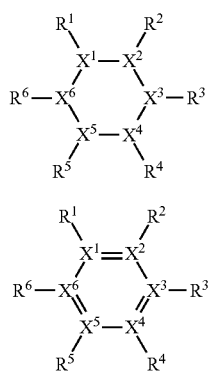

$X^1$, $X^2$, $X^3$, $X^4$, $X^5$, and $X^6$ are the same or different and are selected from the group consisting of C and N. $R^1$, $R^2$, $R^3$, $R^4$, $R^5$, and $R^6$ are the same or different and are selected from the group consisting of hydrogen, amino, sulfo, hydroxo, carboxyl, methyl, ethyl, propyl, butyl, pentyl, hexyl, heptyl, octyl, nonyl, phosphono, trifluoromethyl, trichloromethyl, tribromomethyl, 4-(carboxyphenol) benzyl, substituted or unsubstituted benzyl, and substituted or unsubstituted biphenyl. The organic acid linker comprises at least two carboxyl groups.

According to yet another aspect of the present disclosure, which includes any of the foregoing aspects, the organic acid linker is selected from the group consisting of terephthalic acid, 2-hydroxyterephthalic acid, 2,5-dihydroxyterephthalic acid, 2-aminoterephthalic acid, 2,5-diaminoterephthalic acid, 2-sulfoterephthalic acid, 2,5-disulfoterephthalic acid, 2-methylterephthalic acid, 2,5-methylterephthalic acid, 2-phosphonoterephtahlic acid, 2,5-diphosphonoterephthalic acid, cyclohexane-1,2,4,-tricarboxylic acid, 1,2,4,5-benzenetetracarboxylic acid, cyclohexane-1,2,4,5-tetracarboxylic acid, fumaric acid, 1,4-naphthalenedicarboxylic acid, biphenyl-4,4'-dicarboxylic acid, 2-amino-4,4'-biphenyldicarboxylic acid, 2-sulfo-4,4'-biphenyldicarboxylic acid, trimesic acid, 1,3,5-cyclohexanetricarboxylic acid, 2-methylimidazole, benzimidazole, 1,3,5-benzenetrisulfonic acid, 1,4-benzenedisulfonic acid, tetraethyl-4,4',4'',4'''-(pyrene-1,3,6,8-tetrayl)tetrabenzoic acid.

According to another aspect of the present disclosure, which may include any of the foregoing aspects, the organic acid linker is 2-aminoterephthalic acid.

According to yet another aspect of the present disclosure, which may include any of the foregoing aspects, the third pH is from 0.1 to 3 pH units greater than the highest $pK_a$ of the organic acid linker.

According to another aspect of the present disclosure, which may include any of the foregoing aspects, the base used in buffering the metal solution is selected from the group consisting of ammonium acetate, sodium carbonate, sodium bicarbonate, dimethylamine, triethylamine, ammonium bicarbonate, disodium hydrogen phosphate, sodium chloride, sodium acetate, sodium citrate, sodium hydroxide, potassium hydroxide, potassium carbonate, potassium bicarbonate, calcium carbonate, calcium bicarbonate, or any combination thereof.

According to another aspect of the present disclosure, which may include any of the foregoing aspects, the third pH is from 5 to 8.

According to another aspect of the present disclosure, which may include any of the foregoing aspects, the first pH is from greater than zero to 7, and the second pH is from 5.5 to 12.5.

According to another aspect of the present disclosure, which may include any of the foregoing aspects, the method further comprises heating the metal solution at a temperature, and subsequently allowing the metal solution to cool to room temperature.

According to another aspect of the present disclosure, which may include any of the foregoing aspects, the method further comprises adding weak organic acid to the metal solution.

According to another aspect of the present disclosure, which may include any of the foregoing aspects, the method further comprises adding an acid to the metal solution, the acid selected from the group consisting of acetic acid, glycine, sulfuric acid, fluoroacetic acid, difluoroacetic acid, trifluoracetic acid, methacrylic acid, acrylic acid, propionic acid, and any combination thereof.

According to another aspect of the present disclosure, which may include any of the foregoing aspects, the linker solution comprises a molar ratio of organic acid linker to base ranging from 1:30 to 1:0.5.

According to another aspect of the present disclosure, which may include any of the foregoing aspects, the MOFs are selected from the group consisting of UiO-66, UiO-66 ($NH_2$), UiO-67, UiO-66 (COOH), UiO-68, HKUST-1, ZIF-8, ZIF-7, NU-901, NU-1000, and a combination thereof.

According to another aspect of the present disclosure, which may include any of the foregoing aspects, the MOFs are produced in less than 1 minute.

According to another aspect of the present disclosure, which may include any of the foregoing aspects, a method of coating textiles with MOFs includes preparing a metal solution by dissolving at least one metal salt in an aqueous solution and buffering the metal solution with a base to achieve a first pH, the metal solution optionally comprising an organic co-solvent, preparing a linker solution by adding at least one organic acid linker and at least one base to an aqueous solution, mixing the metal solution and the linker solution to produce the MOFs, and applying the MOFs to the textile to produce textiles coated with MOFs. The at least one organic acid linker has an ability to be protonated or deprotonated in response to a second pH, and the mixture of the metal solution and the linker solution has a third pH value, where the third pH value is greater than a highest $pK_a$ of the organic acid linker.

According to another aspect of the present disclosure, which may include any of the foregoing aspects, the mixing of the metal solution and linker solution is performed prior to the applying of the MOFs to the textile.

According to another aspect of the present disclosure, which may include any of the foregoing aspects, the applying of the MOFs to the textile comprises first applying the metal solution to the textile and then applying the linker solution to the textile having the applied metal solution thereon.

According to another aspect of the present disclosure, which may include any of the foregoing aspects, the applying of the MOFs to the textile comprises dip-coating or spray coating the textile.

According to another aspect of the present disclosure, which may include any of the foregoing aspects, a system to synthesize MOFs includes a metal solution comprising at least one metal salt dissolved in an aqueous solution having a first pH, the metal solution optionally comprising an organic co-solvent, a linker solution separated from the metal solution comprising at least one organic acid linker and at least one base to an aqueous solution. The at least one organic acid linker has an ability to be protonated or deprotonated in response to a second pH, and the metal solution and the linker solution are operable to be mixed to produce the MOFs in a mixed solution having a third pH value, the third pH value being greater than a highest $pK_a$ of the organic acid linker.

According to another aspect of the present disclosure, which may include any of the foregoing aspects, a method of synthesis of MOFs includes preparing a stable precursor solution by dissolving at least one metal salt and at least one organic acid linker in a solvent; and contacting the stable precursor solution with an antisolvent to produce the MOFs.

According to another aspect of the present disclosure, which may include any of the foregoing aspects, the at least one metal salt is $Cu(NO_3)_2 \cdot 5\,H_2O$, the at least one organic acid linker is trimesic acid, the solvent is DMSO, and the antisolvent is ethanol.

These and other embodiments are described in more detail in the following Detailed Description and the Drawings.

DETAILED DESCRIPTION

Figure 1A:
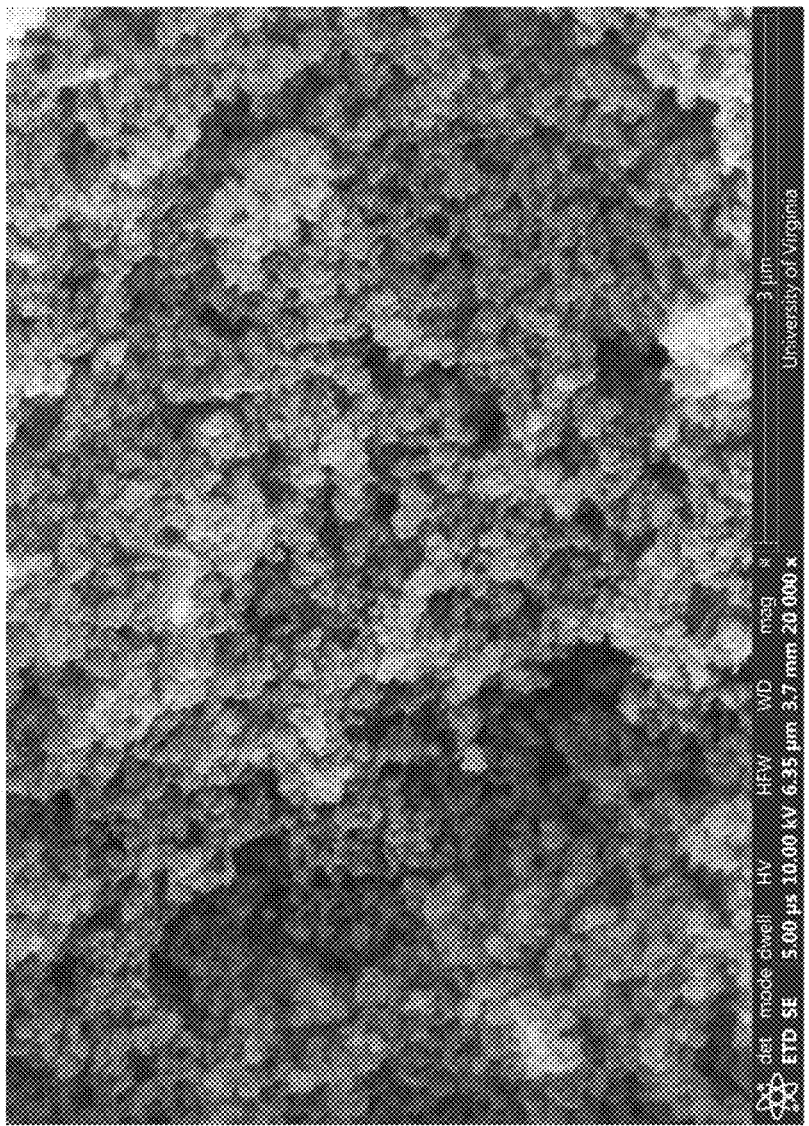
FIG. 1A is a scanning electron micrograph pertaining to an UiO-66 ($NH_2$) MOF rapidly synthesized in the bulk in accordance with embodiments described herein.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Reference will now be made in detail to methods of synthesis of MOFs. In one or more embodiments, MOFs are prepared by allowing a metal solution to react with a linker solution. The metal solution may be prepared by dissolving at least one metal salt in an aqueous solution and adding a buffer. The linker solution may be prepared by adding at least one organic acid linker and at least one base to an aqueous solution. The metal solution and the linker solution may then be mixed together to produce the MOFs.

Metal Solution

The metal solution includes a metal salt in an aqueous solution. The metal salt may be, for instance, $ZrOCl_{12}$, $ZrCl_4$, $ZrBr_4$, $ZrI_4$, $ZrO(NO_3)_2$, $Zr(ClO_4)_4$ $Zr(SO_4)_2$, $Zr(PO_4)_4$ $ZrO(CH_3COO)_2$, $Zr(C_6H_5O_7)$ ("Zirconium citrate"), $Zr(CH_2C(CH_3)CO_2)_4$ ("Zirconium methacrylate"), $Zr(CH_2CHCO_2)_4$ ("Zirconium acrylate"), $Zr(OC_4H_9)_4$ ("Zirconium tertbutoxide"), $Zr(OCH_2CH_2CH_3)_4$ ("Zirconium (IV) propoxide"), $Zr_6O_4(OH)_4$ $(CH_2C(CH_3)CO_2)_{12}$ ("Zirconium (IV) oxo hydroxy methacrylate"), $Cu(NO_3)_2$, CuCl, $CuCl_2$, CuBr, $CuBr_2$, CuI, $CuI_2$, $Cu(ClO_4)_2$, $CuSO_4$, $Cu_3(PO_4)_2$$Cu(CH_3COO)$, $Cu_3(C_6H_5O_7)_2$ ("Copper citrate"), $Cu(CH_2C(CH_3)CO_2)_2$ ("Copper methacrylate"), $Cu(CH_2CHCO_2)_2$ ("Copper acrylate"), $Cu((CH_3)_2CHO)_2$ ("Copper propoxide"), $Zn(NO_3)_2$, $ZnCl_2$, $ZnBr_2$, $ZnI_2$, $Zn(ClO_4)_2$, $ZnSO_4$, $Zn_3(PO_4)_2$, $Zn(CH_3COO)$, $Zn_3(C_6H_5O_7)_2$ ("Zinc citrate"), $Zn(CH_2C(CH_3)CO_2)_2$ ("Zinc methacrylate"), $Zn(CH_2CHCO_2)_2$ ("Zinc acrylate"), $Zn(OCH_2CH_2CH_3)_2$ ("Zinc propoxide"), $AlCl_3$, $AlBr_3$, $AlI_3$, $Al(NO_3)_3$, $Al(ClO_4)_3$, $Al_2(SO_4)_3$, $AlPO_4$, $Al(CH_3COO)_3$, $Al(C_6H_5O_7)$ ("Aluminum citrate"), $Al(CH_2C(CH_3)CO_2)_3$ ("Aluminum methacrylate"), $Al(CH_2CHCO_2)$ 3 ("Aluminum acrylate"), $Al((CH_3)_2CHO)_3$ ("Aluminum propoxide"), $FeCl_2$, $FeCl_3$, $FeBr_3$, $FeI_2$, $Fe(NO_3)_2$, $FeSO_4$, Fez $(SO_4)_3$, $FePO_4$, $Fe(ClO_4)_2$, $Fe(CH_3COO)_2$, $Fe(C_6H_5O_7)$ ("Iron citrate"), $Fe(CH_2C(CH_3)CO_2)_3$ ("Iron methacrylate"), $Fe(CH_2CHCO_2)_3$ ("Iron acrylate"), $Fe((CH_3)_2CHO)$ 3 ("Iron propoxide"), $TiCl_2$, $TiCl_3$, $TiCl_4$, $TiBr_4$, $TiI_4$ $Ti(NO_3)_4$, $Ti(ClO_4)_4$, $Ti(SO_4)_2$, $Ti_3$ $(PO_4)_4$, $Ti(CH_3COO)_4$, $Ti(C_6H_5O_7)$ ("Titanium citrate"), $Ti(CH_2C(CH_3)CO_2)_4$ ("Titanium methacrylate"), $Ti(CH_2CHCO_2)_4$ ("Titanium acrylate"), $Ti((CH_3)_2CHO)_4$ ("Titanium propoxide"), $MgCl_2$, $MgBr_2$, $MgI_2$, $Mg(NO_3)_2$, $Mg(SO_4)$, $Mg(PO_4)_2$, $Mg(ClO_4)_2$, $Mg(CH_3COO)_2$, $Mg(C_6H_5O_7)$ ("Magnesium citrate"), $Mg(CH_2C(CH_3)CO_2)_2$ ("Magnesium methacrylate"), $Mg(CH_2CHCO_2)_2$ ("Magnesium acrylate"), $Mg((CH_3)_2CHO)_2$ ("Magnesium propoxide"), $HfCl_4$, $HfBr_4$, $HfI_4$, $Hf(NO_3)_4$, $Hf(SO_4)_2$, $Hf_3(PO_4)_4$, $Hf(CH_3COO)_4$, $Hf(C_6H_5O_7)$ ("Hafnium citrate"), $Hf(CH_2C(CH_3)CO_2)_4$ ("Hafnium methacrylate"), $Hf(CH_2CHCO_2)_4$ ("Hafnium acrylate"), $Hf((CH_3)_2CHO)_4$ ("Hafnium propoxide"), $CoCl_2$, $CoCl_3$, $CoBr_2$, $CoI_2$, $Co(NO_3)_2$, $Co(ClO_4)_2$, $Co(SO_4)$, $Co(CH_3COO)$, $Co(CH_2C(CH_3)CO_2)_2$ ("Cobalt methacrylate"), $Co(CH_2CHCO_2)_2$ ("Cobalt acrylate"), or $Co((CH_3)_2CHO)_2$ ("Cobalt propoxide").

The metal solution also includes a base for buffering the metal solution. The base may be any appropriate base. For instance, the base may be ammonium acetate, sodium carbonate, sodium bicarbonate, dimethylamine, triethylamine, ammonium bicarbonate, disodium hydrogen phosphate, sodium chloride, sodium acetate, sodium citrate, sodium hydroxide, potassium hydroxide, potassium carbonate, potassium bicarbonate, calcium carbonate, calcium bicarbonate, or any combination thereof.

The base is added to the metal solution as a buffering agent. The metal solution may be at a pH of from greater than zero to 7. For instance, the pH of the metal solution may be in the range of 1 to 6, or 2 to 5, or 3 to 4. This pH, may be 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, or any fractional part thereof.

The metal solution may be heated to a temperature above room temperature and then allowed to cool to room temperature. Such heating may encourage a higher concentration of the metal salt to dissolve in the solution.

Additionally, a weak organic acid may be added to the metal solution. For instance, the weak organic acid may be one or more monocarboxylic acids. Exemplary monocarboxylic acids include, but are not limited to, glycine, benzoic acid, methacrylic acid, formic acid, acetic acid, propionic acid, butyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and mixtures thereof. Additional exemplary organic acids include fluoroacetic acid, difluoroacetic acid, trifluoroacetic acid, acrylic acid, or any combination thereof.

In other embodiments, a mineral acid may be added to the metal solution. For instance, sulfuric acid may be added.

The metal solution may also include an organic co-solvent. This co-solvent is not particularly limited and may include one or more polar aprotic solvents, such as N,N-Dimethylformamide ("DMF"), Dimethyl sulfoxide ("DMSO"), acetone, and acetonitrile, and/or one or more polar solvents, such as dichloromethane ("DCM"), tetrahydrofuran ("THF"), and ethyl acetate. Of course, organic solvents also include non-polar solvents such as pentane, hexane, cyclohexane, benzene, toluene, chloroform, and diethyl ether, as well as polar protic solvents, such as ammonia, alcohols, and acetic acid.

Linker Solution

The linker solution includes at least one organic acid linker and at least one base in an aqueous solution. For instance, the organic acid linker may be at least one of a substituted or unsubstituted straight-chain or branched dicarboxylic acid having at least three carbon atoms and saturated and/or unsaturated C—C bonds, formula (I), formula (II), formula (III), or any combination thereof:

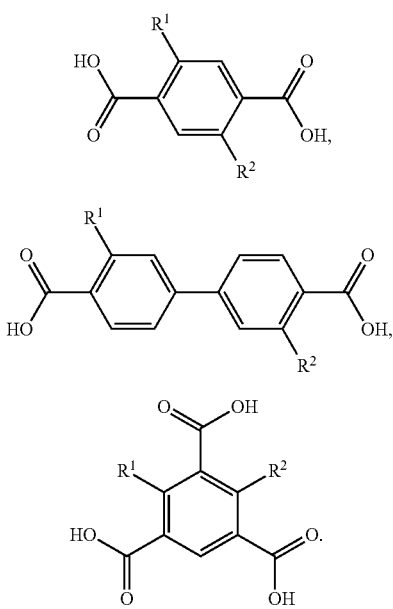

In these formulae, R1 and R2 may be the same or different and are selected from hydrogen, amino, sulfo, hydroxo, carboxyl, methyl, ethyl, propyl, butyl, pentyl, hexyl, heptyl, octyl, nonyl, phosphono, trifluoromethyl, trichloromethyl, and tribromomethyl.

The organic acid linker may also be at least one of formula (IV), formula (V), or any combination thereof:

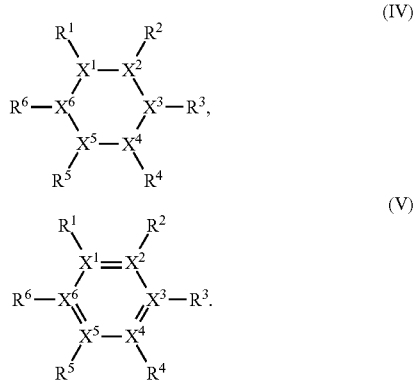

In these formulae, $X^1$, $X^2$, $X^3$, $X^4$, $X^5$, and $X^6$ may be the same or different and are selected from C and N. $R^1$, $R^2$, $R^3$, $R^4$, $R^5$, and $R^6$ may be the same or different and are selected from hydrogen, amino, sulfo, hydroxo, carboxyl, methyl, ethyl, propyl, butyl, pentyl, hexyl, heptyl, octyl, nonyl, phosphono, trifluoromethyl, trichloromethyl, tribromomethyl, 4-(carboxyphenol) benzyl, substituted or unsubstituted benzyl, and substituted or unsubstituted biphenyl. The organic acid linker comprises at least two carboxyl groups.

Exemplary organic acid linkers in accordance with formula (V) include, but are not limited to, 1,3,5-benzenetriacetic acid ("trimesic acid"), 4,4',4",-Benzene-1,3,5-triyl-tris(benzoic acid), 4,4',4"-(triazine-2,4,6-triyl-tris(benzene-4,1-diyl))tribenzoic acid, and 4,4',4"-(benzene-1,3,5-triyl-tris(benzene-4,1-diyl))tribenzoic acid.

The organic acid linker may be, for instance, terephthalic acid, 2-hydroxyterephthalic acid, 2,5-dihydroxyterephthalic acid, 2-aminoterephthalic acid, 2,5-diaminoterephthalic acid, 2-sulfoterephthalic acid, 2,5-disulfoterephthalic acid, 2-methylterephthalic acid, 2,5-methylterephthalic acid, 2-phosphonoterephtahlic acid, 2,5-diphosphonoterephthalic acid, cyclohexane-1,2,4,-tricarboxylic acid, 1,2,4,5-benzenetetracarboxylic acid, cyclohexane-1,2,4,5-tetracarboxylic acid, fumaric acid, 1,4-naphthalenedicarboxylic acid, biphenyl-4,4'-dicarboxylic acid, 2-amino-4,4'-biphenyldicarboxylic acid, 2-sulfo-4,4'-biphenyldicarboxylic acid, trimesic acid, 1,3,5-cyclohexanetricarboxylic acid, 2-methylimidazole, benzimidazole, 1,3,5-benzenetrisulfonic acid, 1,4-benzenedisulfonic acid, tetraethyl 4,4',4",4"'-(pyrene-1,3,6,8-tetrayl)tetrabenzoic acid, or any combination thereof.

These possible organic acid linkers all have the ability to be protonated or deprotonated in response to a pH of the linker solution. Thus, the organic acid linker has at least one logarithmic acid dissociation constant, i.e. at least one $pK_a$. For instance, the MOF UiO-66 $NH_2$ uses 2-aminoterephthalic acid as the organic acid linker. 2-Aminoterephthalic acid is associated with a first $pK_a$ of about 3.5 and a second $pK_a$ of about 4.4. The MOF HKUST-1 uses trimesic acid as the organic acid linker, and trimesic acid is associated with three $pK_a$ values: 3.12, 3.89, and 4.70.

The linker solution also includes a base for controlling this pH. The base may be any appropriate base. For instance, the base may be ammonium acetate, sodium carbonate, sodium bicarbonate, dimethylamine, triethylamine, ammonium bicarbonate, disodium hydrogen phosphate, sodium chloride, sodium acetate, sodium citrate, sodium hydroxide, potassium hydroxide, potassium carbonate, potassium bicarbonate, calcium carbonate, calcium bicarbonate, or any combination thereof.

The base is added to the linker solution to cause a pH of the linker solution to range from 5.5 to 14. For instance, the pH of the linker solution may be in the range of 6.5 to 11.5, or 7.5 to 10.5, or 8.5 to 9.5. This pH, may be 5.5, 6, 6.5, 7, 7.5, 8, 8.5, 9, 9.5, 10, 10.5, 11, 11.5, 12, 12.5, 13, 13.5, 14, or any fractional part thereof.

In some embodiments, the linker solution may include a molar ratio of organic acid linker to base ranging from 1:30 to 1:0.5. For instance, this ratio may be 1:30, 1:29.5, 1:29, 1:28.5, 1:28, 1:27.5, 1:27, 1:26.5, 1:26, 1:25.5, 1:25, 1:24.5, 1:24, 1:23.5, 1:23, 1:22.5, 1:22, 1:21.5, 1:21, 1:20.5, 1:20, 1:19.5, 1:19, 1:18.5, 1:18, 1:17.5, 1:17, 1:16.5, 1:16, 1:15.5, 1:15, 1:14.5, 1:14, 1:13.5, 1:13, 1:12.5, 1:12, 1:11.5, 1:11, 1:10.5, 1:10, 1:9.5, 1:9, 1:8.5, 1:8, 1:7.5, 1:7, 1:6.5; 1:6, 1:5.5, 1:5, 1:4.5, 1:4, 1:3.5, 1:3, 1:2.5, 1:2, 1:1.5, 1:1, 1:0.5, or any fractional part thereof.

Synthesis of MOFs

Once the metal solution and the linker solution are prepared, as described above, the two solutions may be mixed to produce MOFs. This mixing may take place in a single container, or this mixing may take place on a substrate to which each of the metal solution and the linker solution have been applied.

Upon mixing, the mixture may have a pH that is greater than the highest $pK_a$ of the organic acid linker. The pH of the mixture may be, for instance, 0.1 to 3 pH units greater than the highest $pK_a$ of the organic acid linker. For example, the pH of the mixture may be 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3.0, or any fractional part thereof greater than the highest $pK_a$ of the organic acid linker. This pH may, for example, range from 5 to 8 or from 5.5 to 7.5 or from 6 to 7. The pH may be, for example, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, or any fractional part thereof. Without being limited to theory, achieving a mixed solution of metal solution and linker solution having a pH greater than the $pK_a$ of the organic linker was surprisingly found to increase the speed of MOF synthesis.

The MOFs prepared using this process are not particularly limited. Exemplary MOFs capable of being prepared by the above process include, but are not limited to, zirconium MOFs, such as UiO-66, UiO-66 ($NH_2$), UiO-67, UiO-66 (COOH), and NU-1000, copper MOFs, such as HKUST1, and zinc MOFs, such as ZIF-8. Other MOFs may be prepared in accordance with the process described above. In general, MOF synthesis involves forming an ioncluster which then reacts with the organic acid linker to produce the MOF. A more complex metal ioncluster requires a longer synthesis time to form the ioncluster in a specific conformation. For instance, in the case of UiO-66, a hexanuclear zirconium oxocluster must be formed, although many other zirconium oxocluster species may exist, e.g. tetranuclear or zirconium ions. This step may be separated out to create a pre-formed ioncluster as a reactant, or the MOF may be formed using metal ions in solution.

In various embodiments, the MOFs may be produced in less than 10 minutes of mixing the metal solution and the linker solution. In various embodiments, the MOFs may be produced in less than 9 minutes of mixing the metal solution and the linker solution. In various embodiments, the MOFs may be produced in less than 8 minutes of mixing the metal solution and the linker solution. In various embodiments, the MOFs may be produced in less than 7 minutes of mixing the metal solution and the linker solution. In various embodiments, the MOFs may be produced in less than 6 minutes of mixing the metal solution and the linker solution. In various embodiments, the MOFs may be produced in less than 5 minutes of mixing the metal solution and the linker solution. In various embodiments, the MOFs may be produced in less than 4 minutes of mixing the metal solution and the linker solution. In various embodiments, the MOFs may be produced in less than 3 minutes of mixing the metal solution and the linker solution. In various embodiments, the MOFs may be produced in less than 2 minutes of mixing the metal solution and the linker solution. In various embodiments, the MOFs may be produced in less than 1 minutes of mixing the metal solution and the linker solution. In various embodiments, the MOFs may be produced in less than 30 seconds of mixing the metal solution and the linker solution. In various embodiments, the MOFs may be produced in less than 15 seconds of mixing the metal solution and the linker solution. In various embodiments, the MOFs may be produced in less than 5 seconds of mixing the metal solution and the linker solution.

Kits for the Synthesis of MOFs

One advantage of the synthetic method described above is that this method allows for the assembly of kits for the synthesis of the MOFs. The kit may include a metal solution and a linker solution, as described above, which are operable to be mixed to produce MOFs. The conditions for the mixing are provided in greater detail above.

The resulting mixture may have a pH value that is greater than a highest $pK_a$ of the organic acid linker. The pH of the mixture may be, for instance, 0.1 to 3 pH units greater than the highest $pK_a$ of the organic acid linker. For example, the pH of the mixture may be 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, or any fractional part thereof greater than the highest $pK_a$ of the organic acid linker. This pH may, for example, range from 5 to 8 or from 5.5 to 7.5 or from 6 to 7. The pH may be, for example, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8 or any fractional part thereof.

The metal solution and the linker solution may be pre-mixed in the kit, or the two solutions may be provided as two separate components. These arrangements may allow for production of uniform batches of MOFs, even when carried out months or years apart from one another. Further, the modular nature of the kits would allow for a wide variety of metal salts and organic acid linkers to be readily available for fine tuning of the properties of the MOFs produced.

Method of Coating Textiles

The MOFs described above may be applied to textiles to produce textiles coated with the MOFs. In some embodiments, the MOFs may be applied after mixing the metal solution and the linker solution together to produce a mixture and then applying the mixture to the textiles. For instance, the textiles may be submerged in a vat of the mixture and then removed therefrom. In other embodiments, the mixture may be applied to the textiles by a spray coating process. For instance a continuous stream of the textile could be passed through a spray zone that has been charged with the mixture.

In other embodiments, the metal solution may first be applied to the textile and then the linker solution may be applied to the textile previously coated with the metal solution. For instance, the textiles may be submerged in a vat of the metal solution, removed therefrom, and then submerged in a vat of the linker solution. In other embodiments, the mixture may be applied to the textiles by a spray coating process. For instance a continuous stream of the textile could be passed through a metal solution spray zone and then through a linker solution spray zone.

Of course, one of ordinary skill in the art would understand that the order of applying the metal solution and the linker solution is immaterial. Thus, the metal solution may be applied first, followed by the linker solution, or the linker solution may be applied first, followed by the metal solution.

In other embodiments, a precursor solution containing both the metal salt and the organic acid linker may be prepared. This solution need not be aqueous, and many different solvents may be selected. For instance, the solvent may be one or more polar aprotic solvents, such as N,N-Dimethylformamide ("DMF"), Dimethyl sulfoxide ("DMSO"), acetone, and acetonitrile, and/or one or more polar solvents, such as dichloromethane ("DCM"), tetrahydrofuran ("THF"), and ethyl acetate. Of course, organic solvents also includes non-polar solvents, such as pentane, hexane, cyclohexane, benzene, toluene, chloroform, and diethyl ether, as well as polar protic solvents, such as ammonia, alcohols, and acetic acid. The stable precursor solution includes both a metal salt and organic acid base, but no MOFs are formed in this precursor solution. An exemplary metal salt may include $Cu(NO_3)_2*5\ H_2O$. An exemplary organic acid linker may include trimesic acid. Of course, any of the above mentioned metal salts and organic acid linkers may be used in accordance with these embodiments. An antisolvent may then be added to the mixture to cause MOF formation. Suitable antisolvents for this method include organic alcohols such as methanol, ethanol, isopropanol, 2-propanol, and any combination thereof.

Suitable textiles include, but are not limited to, cotton, bamboo fibers, cellulose, wool, hemp, flax, tow, acrylic, nylon, silk, glass fiber, rayon, polyester, polyethersulfone, canvas, and any combination thereof.

In some embodiments, the textile may be exposed briefly to the precursor solution for a first exposure. This first exposure may range from greater than 0 seconds to 20 seconds, or from 5 seconds to 15 seconds, or from 8 seconds to 12 seconds. The exposure may be for less than 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, or any fractional part thereof. Then, the textile may be exposed to an antisolvent for a second exposure. This second exposure may range from greater than 0 seconds to 20 seconds, or from 5 seconds to 15 seconds, or from 8 seconds to 12 seconds. The exposure may be for less than 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, or any fractional part thereof. This process may be repeated as necessary to obtain the desired amount of MOFs on the textiles.

Testing Methods

The test methods include the following:

X-Ray Diffraction

All X-ray diffraction (XRD) patterns were recorded on a PANalytical Empyrean X-ray diffractometer (Malvern Panalytical, Egham, UK) with a Cu K-α beam ($\lambda$=1.54 Å). Scans were completed from 2θ of 5° to 50°.

Scanning Electron Microscopy

Scanning electron microscopy (SEM) micrographs were collected with a Helios Dual Beam FIB G4 UC at 10 kV with an equivalent spot size of 4 at various magnifications.

Fourier Transform Infrared Spectroscopy

Fourier transform infrared spectroscopy (FTIR) were collected using a Perkin Elmer Frontier MIR/NIR in attenuated total reflectance (ATR) mode.

pH Measurement pH measurements were recorded using a Mettler Toledo SevenCompact 220 benchtop meter with an InLab Expert Pro-ISM probe calibrated with stock calibrant from Mettler Toledo.

Examples

The following examples illustrate features of the present disclosure but are not intended to limit the scope of the disclosure.

MOFs Used

The following MOFs were prepared in accordance with aspects of the invention, and the identified MOFs were subjected to further analysis and are discussed further below. The sources of the materials are identified in Table 1.

TABLE 1

Exemplary MOFs as Embodiments of the Invention

| MOF | Metal Salt | Source | Linker | Highest $pK_a$ | Source |
|---|---|---|---|---|---|
| UiO-66* | $ZrOCl_2$ | Sigma Aldrich | Terephthalic acid | 4.46 | Sigma Aldrich |
| UiO-66 (NH$_2$)* | $ZrOCl_2$ | Sigma Aldrich | 2-Aminoterephthalic acid | 4.4 | Sigma Aldrich |
| UiO-67 | $ZrOCl_2$ | Sigma Aldrich | Biphenyl-4,4'-dicarboxylic acid | 4.2[1] | Sigma Aldrich |
| HKUST-1* | $Cu(NO_3)_2$ 2.5 $H_2O$ | Sigma Aldrich | Trimesic acid | 4.7 | Sigma Aldrich |
| ZIF-8* | $Zn(NO_3)_2$ 2.5 $H_2O$ | Sigma Aldrich | 2-Methylimidazole | 7.86 | Alfa Aesar |

*MOFs subjected to further analysis and discussed further below.
[1]This value is estimated based on the $pK_a$ of benzoic acid, which is believed to have a similar $pK_a$.

General Synthesis of UiO-66 and Derivatives Thereof

Metal Solution:

1 mmol of $ZrOCl_2$ was dissolved in 3 ml of $H_2O$ and 1.25 ml acetic acid. This solution was heated at 70° C. for 2 hours and allowed to cool to room temperature over the course of 1 hour. Typically, the pH of the resulting solution was less than 1. In a selection of experiments, 10-20 mmol of base, such as $NaHCO_3$ or ammonium acetate, were also added to the metal solution.

Linker Solution:

1 mmol of the appropriate linker from Table 1 was added to 5 ml of $H_2O$ with 2 mmol of NaOH. Typically, the pH of the resulting solution was about 8.75.

MOF Synthesis (Bulk Formation):

5 ml of the linker solution was poured into 4.25 ml of the metal solution and vigorously stirred for 30 seconds at room temperature. A pale yellow precipitate, i.e., the MOF, was formed immediately upon mixing. The resulting pH of the mixed solution ranged from 4.6 to 5.6, depending on quantity of base added to the metal solution, or 0.14-1.14 pH units higher than the highest $pK_a$ of the organic acid linker. The precipitate was immediately centrifuged at 8000 RPM for 5 minutes and the solvent was exchanged with fresh deionized water. The filtrate was re-suspended. This washing procedure was repeated 3 times before characterization.

MOF Synthesis (Direct Formation):

Several techniques were used to demonstrate direct rapid MOF growth on various substrates including 100% cotton, 100% bamboo, alpha cellulose, functionalized 80% acrylic/20% nylon, and polyethersulfone membrane material.

For dip coating, a cleaned substrate was cut to 1 cm×2 cm strips. Each substrate was submerged in the metal solution for 5 seconds during which absorption of the solution was observed. Excess solution was removed from the substrate by padding with an absorbent towel. The pad-dried substrate was then submerged into the linker solution for 5 seconds, and a color change from nearly clear to pale yellow was observed. The resulting substrate was removed and again dried with fresh padding material. This process was repeated several times, during which the color intensity of the fabric increased. Fabrics were rinsed thoroughly with deionized water or sonicated in deionized water before characterization.

For spray coating, cleaned substrate was cut to about 10 cm×10 cm sections. Each substrate was sprayed with a 5 second burst using an airbrush spray coating device (Paasche H-CARD Single Action). Excess solution was removed from the substrate by padding with an absorbent towel. The pad-dried substrate was then sprayed for 5 seconds with the linker solution, and a color change from nearly clear to pale yellow was observed. The resulting substrate was removed and again dried with fresh padding material. This process was repeated several times, during which color intensity of the fabric increased. Fabrics were rinsed thoroughly with deionized water or sonicated in deionized water before characterization.

General Synthesis of HKUST-1

Metal Solution:

2.76 mmol of $CuNO_3$ was dissolved in 10 ml of $H_2O$. Typically, the pH of the resulting solution was about 3.6.

Linker Solution:

2.76 mmol of the linker, trimesic acid, was added to 10 ml of $H_2O$ with 3 mmol of NaOH. Additional NaOH was added to adjust the final linker solution pH to 11.

MOF Synthesis (Bulk Formation):

5 ml of the linker solution was poured into 5 ml of the metal solution and vigorously stirred for 30 seconds. A pale blue precipitate i.e., the MOF, was formed immediately upon mixing. The resulting pH of the mixed solution was 5.7, or 1.0 pH units higher than the highest $pK_a$ of the organic acid linker. The precipitate was immediately centrifuged at 8000 RPM for 5 minutes, and the solvent was exchanged with fresh solvent. The filtrate was re-suspended. This washing procedure was repeated 2 times with deionized water and 1 time with ethanol before characterization.

MOF Synthesis (Direct Formation):

Several techniques were used to demonstrate direct rapid MOF growth on various substrates including 100% cotton, 100% bamboo, and alpha cellulose.

For dip coating, cleaned substrate was cut to 1 cm×2 cm strips. Each substrate was submerged in the metal solution for 5 seconds during which absorption of the solution was observed. Excess solution was removed from the substrate by padding with an absorbent towel. The pad-dried substrate was then submerged into the linker solution for 5 seconds, and a color change from nearly clear to pale blue was observed. The resulting substrate was removed and again dried with fresh padding material. This process was repeated several times, during which color intensity of the fabric increased. Fabrics were rinsed thoroughly with deionized water or sonicated in deionized water before characterization. Upon activation by drying in a vacuum oven at −25 mmHg and 100° C., a color change to dark blue was observed, indicating desolvation of copper node in HKUST-1.

For spray coating, cleaned substrate was cut to about 10 cm×10 cm sections. Each substrate was sprayed with a 5 second burst using an airbrush spray coating device (Paasche H-CARD Single Action). Excess solution was removed from the substrate by padding with an absorbent towel. The pad-dried substrate was then sprayed for 5 seconds with the linker solution, and a color change from nearly clear to pale blue was observed. The resulting substrate was removed and again dried with fresh padding material. This process was repeated several times, during which the color intensity of the fabric increased. Fabrics were rinsed thoroughly with deionized water or sonicated in deionized water before characterization.

General Synthesis of ZIF-8

Metal Solution:

1 mmol of $ZnNO_3$ was dissolved in 3 ml of $H_2O$. Typically, the pH of the resulting solution was about 6.1.

Linker Solution:

10 mmol of the linker, 2-methylimidazole, was added to 5 ml of $H_2O$. The resulting solution typically had a pH of about 11.0-20 mmol of sodium acetate or sodium bicarbonate could be added to buffer the pH around 8.5.

MOF Synthesis (Bulk Formation):

5 ml of the linker solution was poured into 3 ml of the metal solution and vigorously stirred for 30 seconds. The resulting pH of the mixed solution was 8.7, or 0.84 pH units higher than highest $pK_a$ of the organic acid linker. A pale white precipitate i.e., the MOF, was formed immediately upon mixing. The precipitate was immediately centrifuged at 8000 RPM for 5 minutes, and the solvent was exchanged with fresh solvent. The filtrate was re-suspended. This washing procedure was repeated 2 times with deionized water and 1 time with ethanol before characterization.

MOF Synthesis (Direct Formation):

Several techniques were used to demonstrate direct rapid MOF growth on various substrates including 100% cotton, 100% bamboo, and alpha cellulose.

For dip coating, cleaned substrate was cut to 1 cm×2 cm strips. Each substrate was submerged in the metal solution for 5 seconds during which absorption of the solution was observed. Excess solution was removed from the substrate by padding with an absorbent towel. The pad-dried substrate was then submerged into the linker solution for 5 seconds. The resulting substrate was removed and again dried with fresh padding material. This process was repeated several times, during which color intensity of the fabric increased. Fabrics were rinsed thoroughly with deionized water or sonicated in deionized water before characterization.

For spray coating, cleaned substrate was cut to about 10 cm×10 cm sections. Each substrate was sprayed with a 5 second burst using an airbrush spray coating device (Paasche H-CARD Single Action). Excess solution was removed from the substrate by padding with an absorbent towel. The pad-dried substrate was then sprayed for 5 seconds with the linker solution. The resulting substrate was removed and again dried with fresh padding material. This process was repeated several times, during which the color intensity of the fabric increased. Fabrics were rinsed thoroughly with deionized water or sonicated in deionized water before characterization.

Synthesis of HKUST-1 by the Antisolvent Process

A precursor solution was made by creating a stable metal and linker solution, i.e. no MOF was formed upon mixing. For HKUST-1 this was accomplished by fully dissolving 5.2 mmol of $Cu(NO_3)_2 * 5\ H_2O$ in 5 mL of dimethylsulfoxide to form a copper solution, then fully dissolving 2.6 mmol of trimesic acid into the copper solution. This formed a translucent blue, stable precursor solution.

This stable precursor solution was mixed with ethanol as an antisolvent to rapidly create HKUST-1.

For bulk formation, 10 ml of ethanol was poured into 5 ml of precursor solution and vigorously stirred for 30 seconds at room temperature. A pale blue precipitate formed immediately upon mixing. The precipitate was immediately centrifuged at 8000 RPM for 5 minutes and the solvent was exchanged with fresh water. The filtrate was re-suspended. This washing procedure was repeated 2 times with DMSO and 1 time with ethanol before characterization.

For dip coating, cleaned substrate (alpha cellulose) was cut to 1 cm×2 cm strips. Each substrate was submerged in the precursor solution for 5 seconds during which absorption of the solution was observed. Excess solution was removed from the substrate by padding with an absorbent towel. The pad-dried substrate was then submerged into the antisolvent (ethanol) for 5 seconds, and a color change from nearly white to pale blue was observed. The resulting substrate was removed and again dried with fresh padding material. This process was repeated several times, during which the color intensity of the substrate increased. Substrates were rinsed thoroughly with ethanol before characterization.

Characterization of the MOF-Coated Fabrics

The MOF-coated fabrics produced as described above were then subjected to at least one of SEM, XRD, and FTIR. The figures and Table 2 provide the results of these characterization techniques.

TABLE 2

Characterization of MOF-Coated Fabrics

Figure 1B:
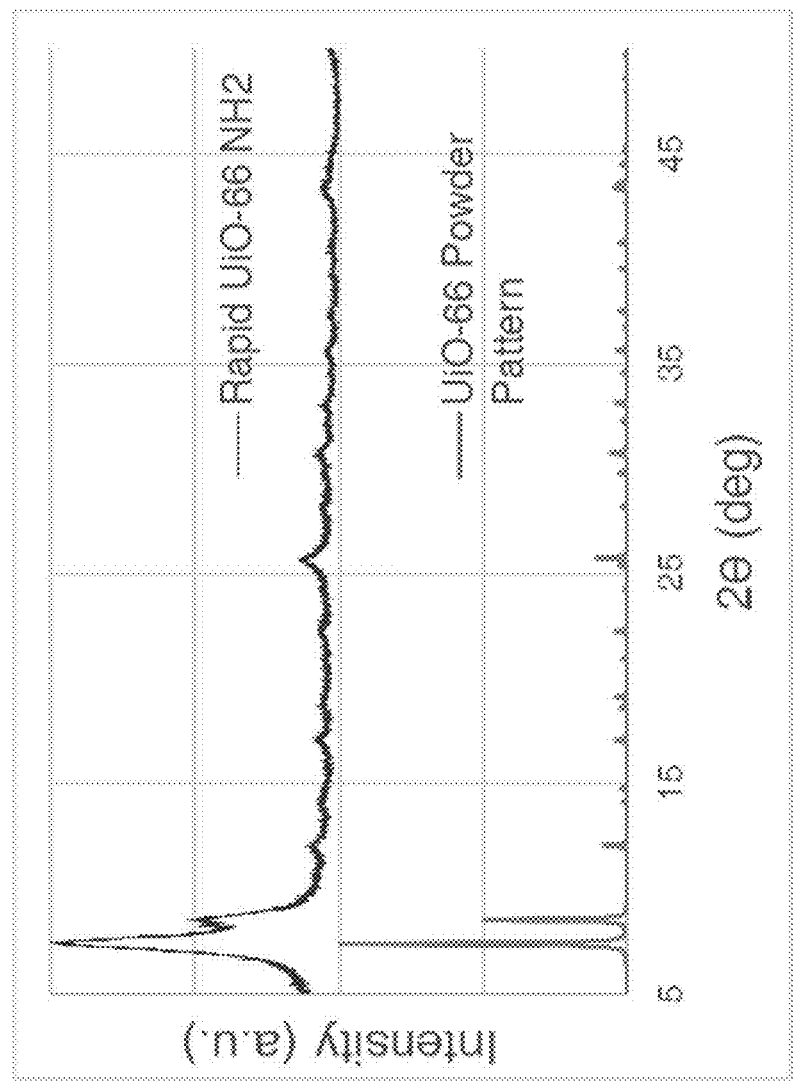
FIG. 1B is X-ray diffraction data pertaining to an UiO-66 ($NH_2$) MOF made in accordance with embodiments described herein.
Figure 2:
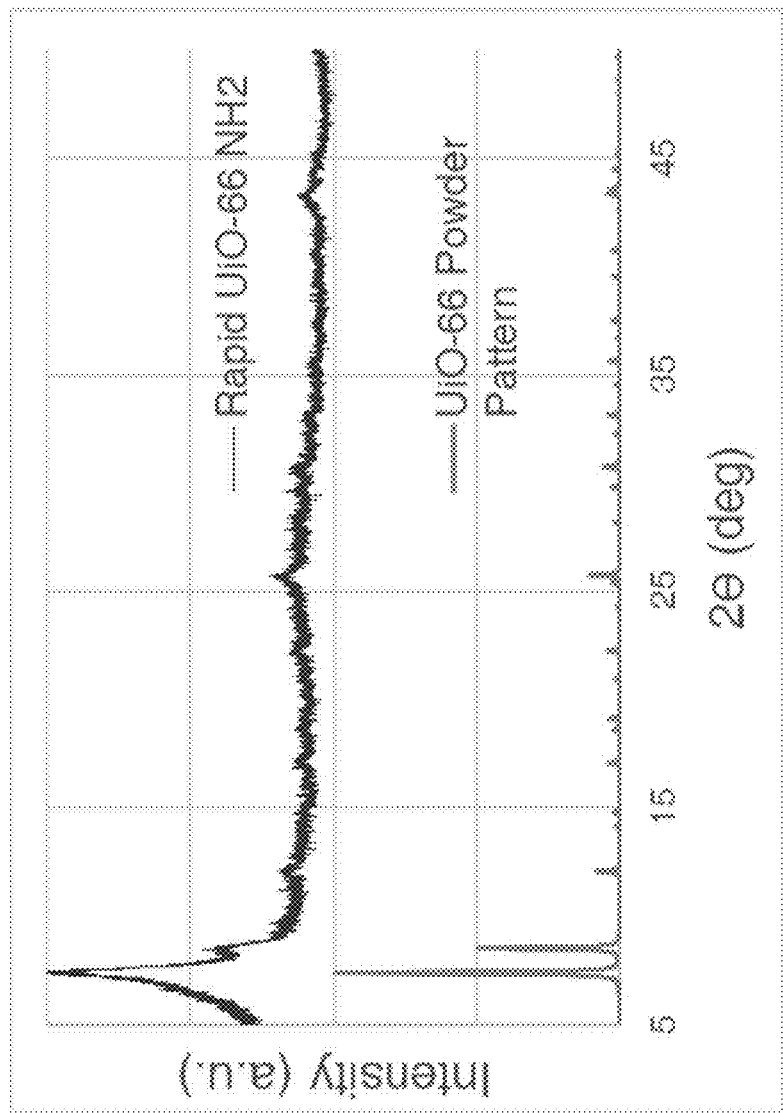
FIG. 2 is X-ray diffraction data pertaining to an UiO-66 ($NH_2$) MOF made in accordance with embodiments described herein.
Figure 3A:
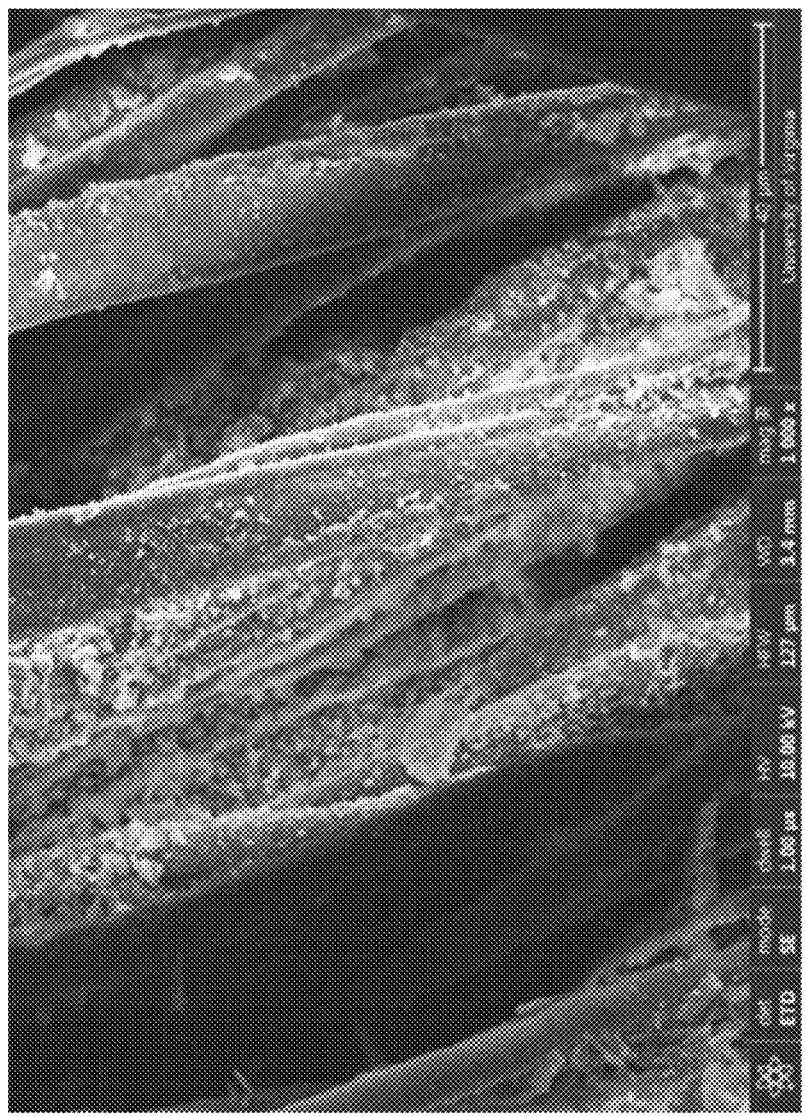
FIG. 3A is a scanning electron micrograph pertaining to an UiO-66 ($NH_2$) MOF applied on 100% cotton in accordance with embodiments described herein.
Figure 3B:
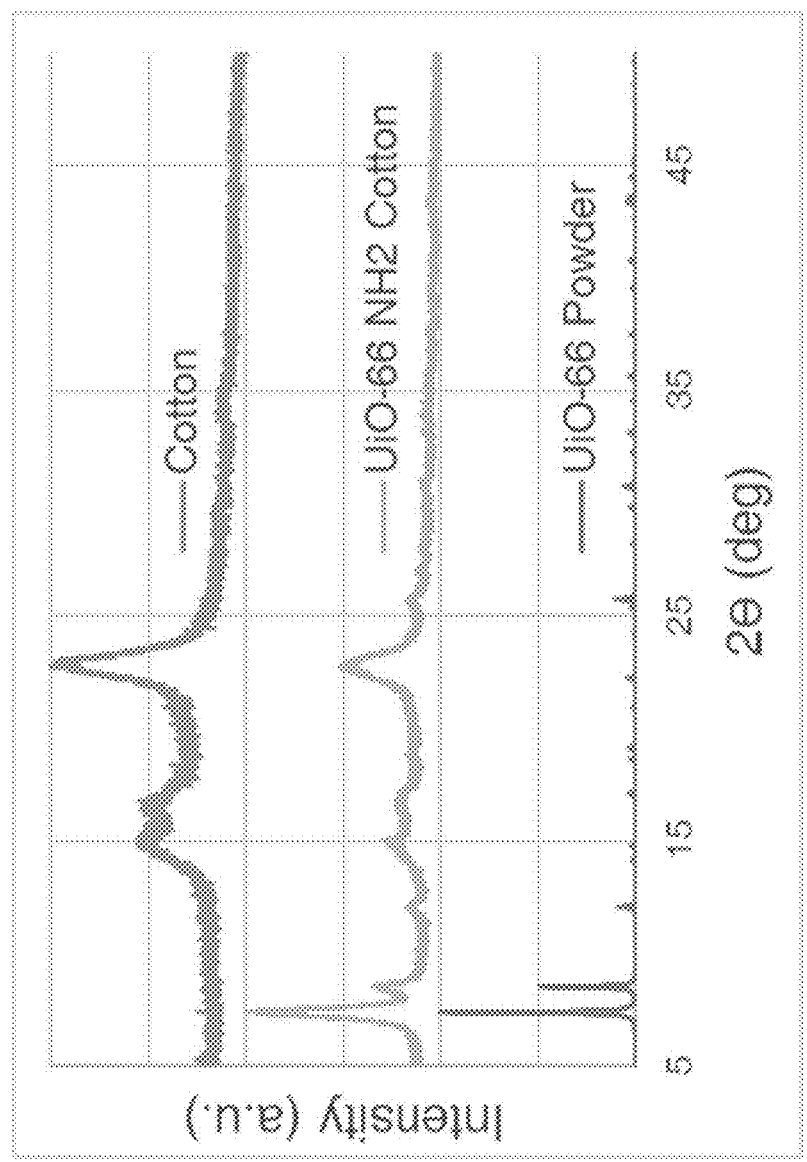
FIG. 3B is X-ray diffraction data pertaining to an UiO-66 ($NH_2$) MOF applied on 100% cotton in accordance with embodiments described herein.
Figure 3C:
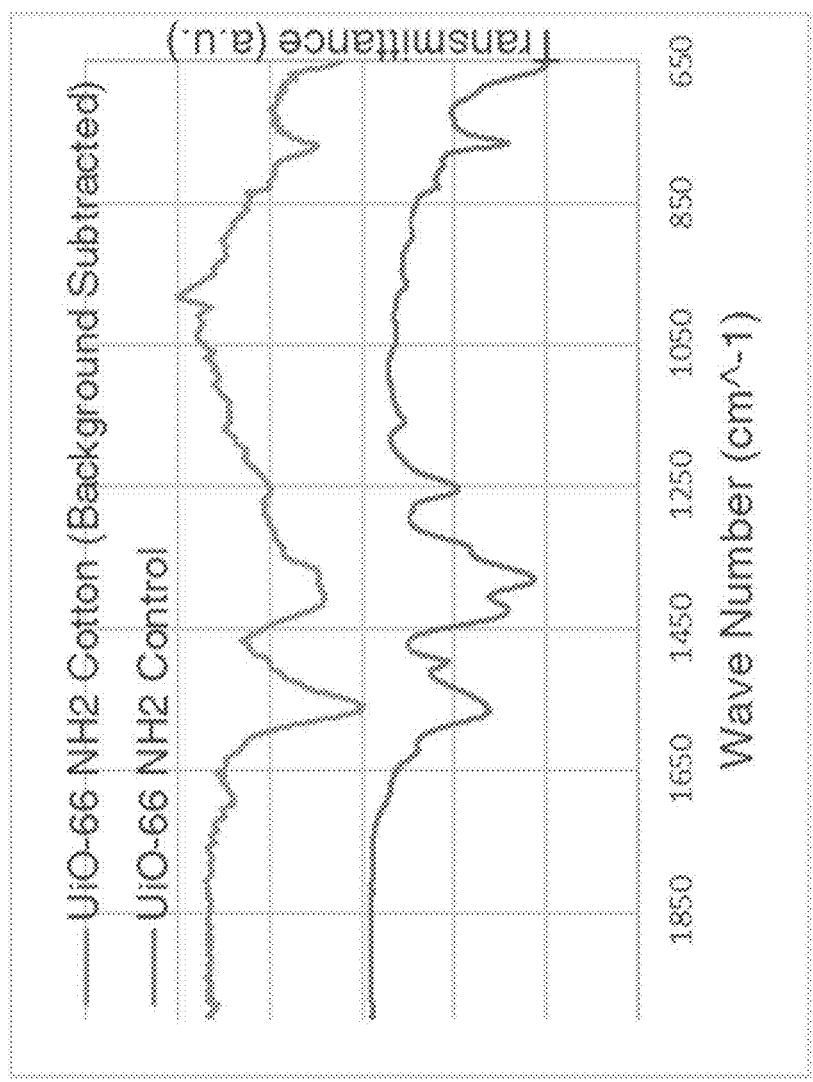
FIG. 3C is Fourier Transform Infrared Spectroscopy data pertaining to an UiO-66 ($NH_2$) MOF applied on 100% cotton in accordance with embodiments described herein.
Figure 4:
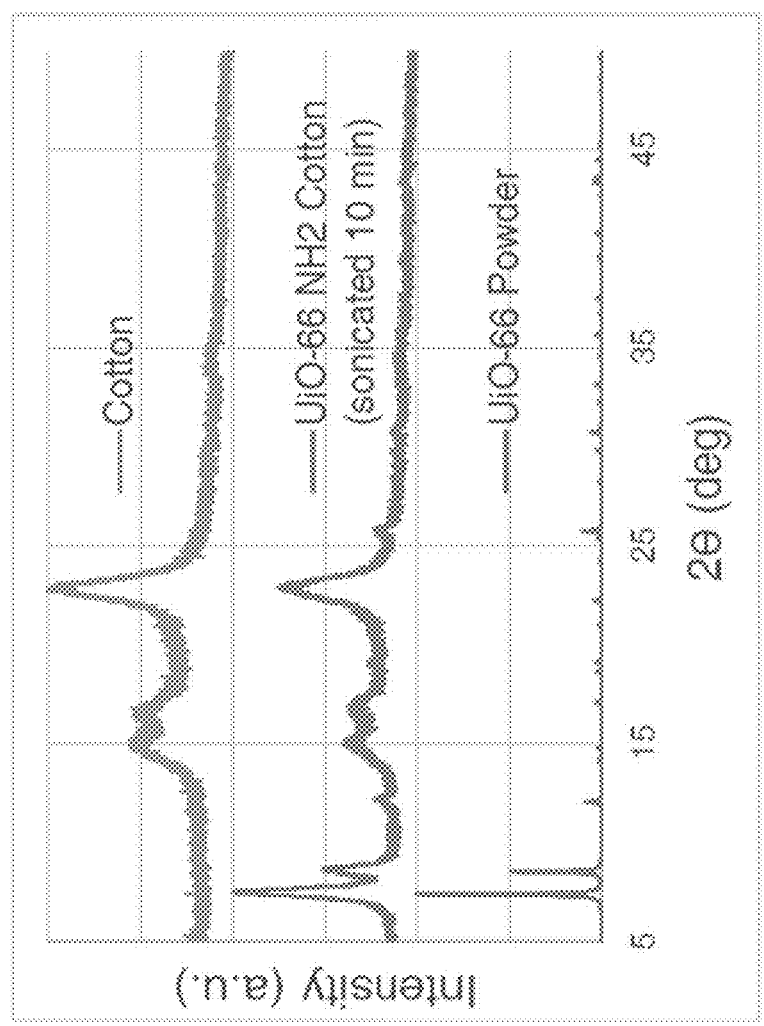
FIG. 4 is X-ray diffraction data pertaining to an UiO-66 ($NH_2$) MOF applied on 100% cotton in accordance with embodiments described herein.
Figure 5A:
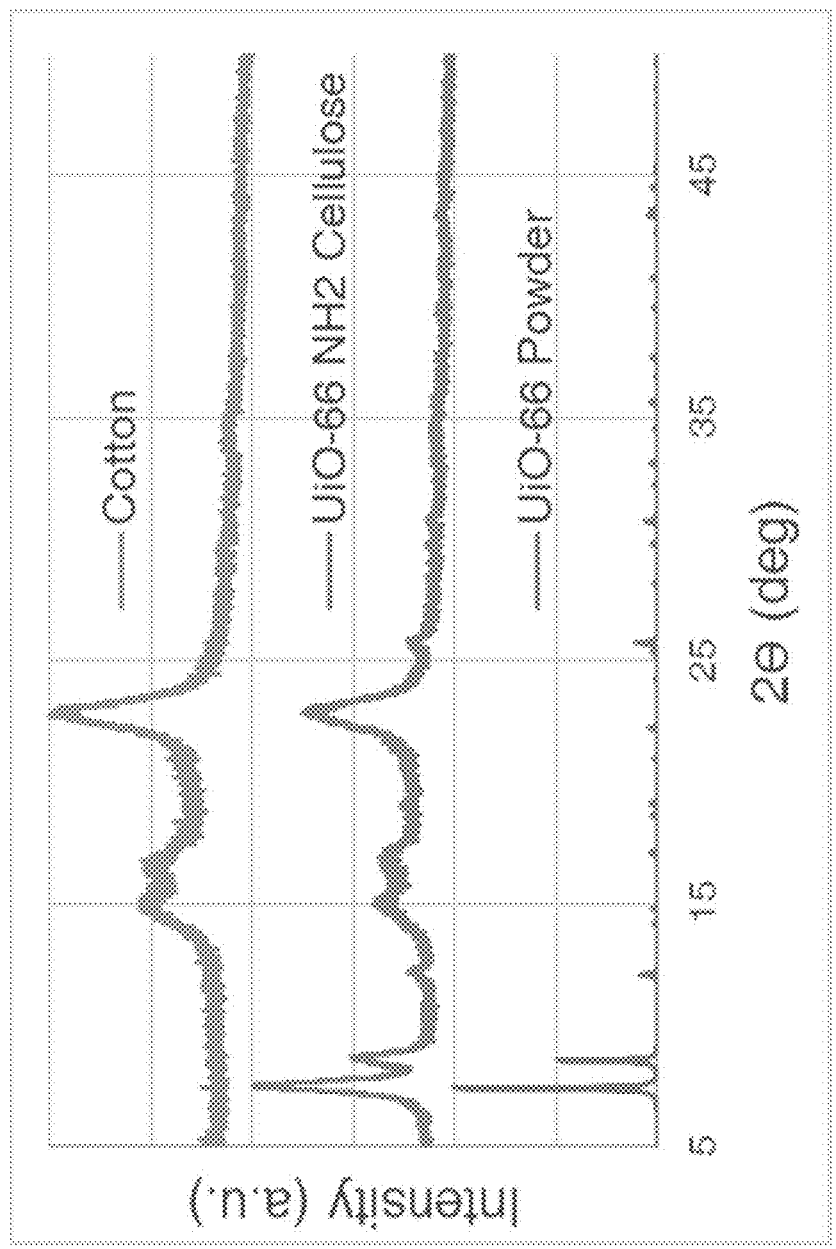
FIG. 5A is X-ray diffraction data pertaining to an UiO-66 ($NH_2$) MOF applied on alpha cellulose in accordance with embodiments described herein.
Figure 5B:
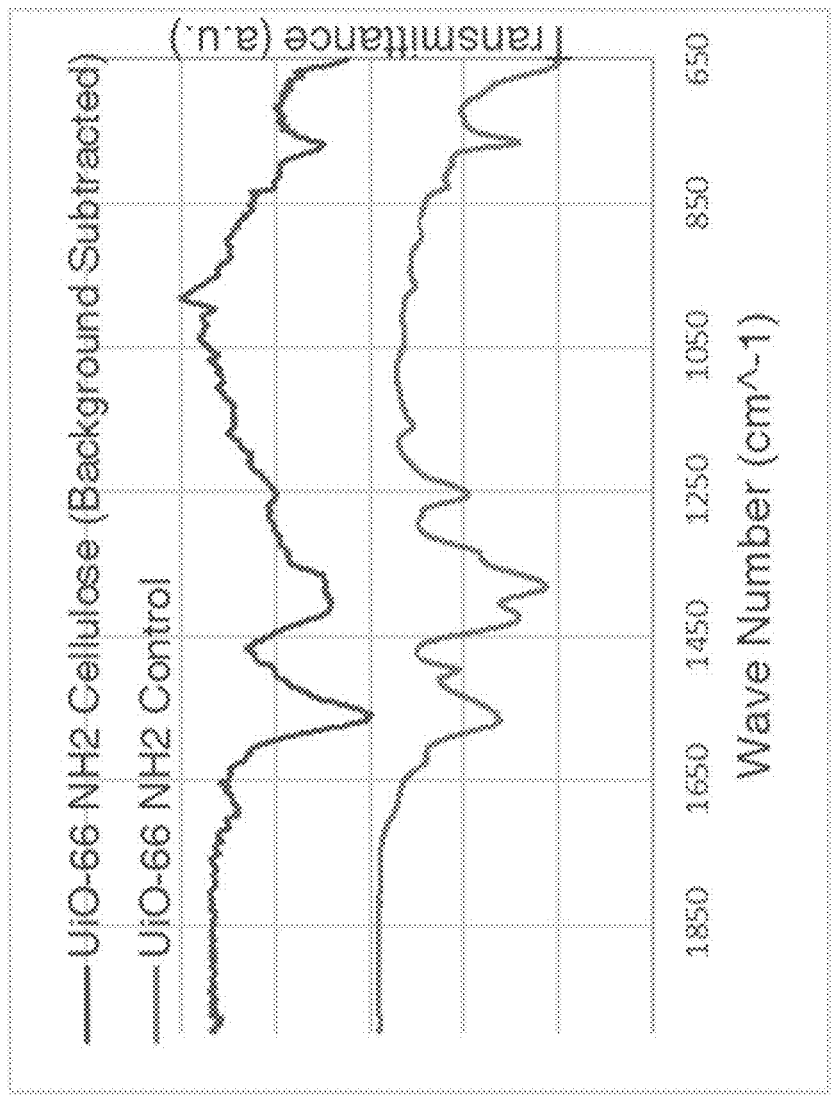
FIG. 5B is Fourier Transform Infrared Spectroscopy data pertaining to an UiO-66 ($NH_2$) MOF applied on alpha cellulose in accordance with embodiments described herein.
Figure 6A:
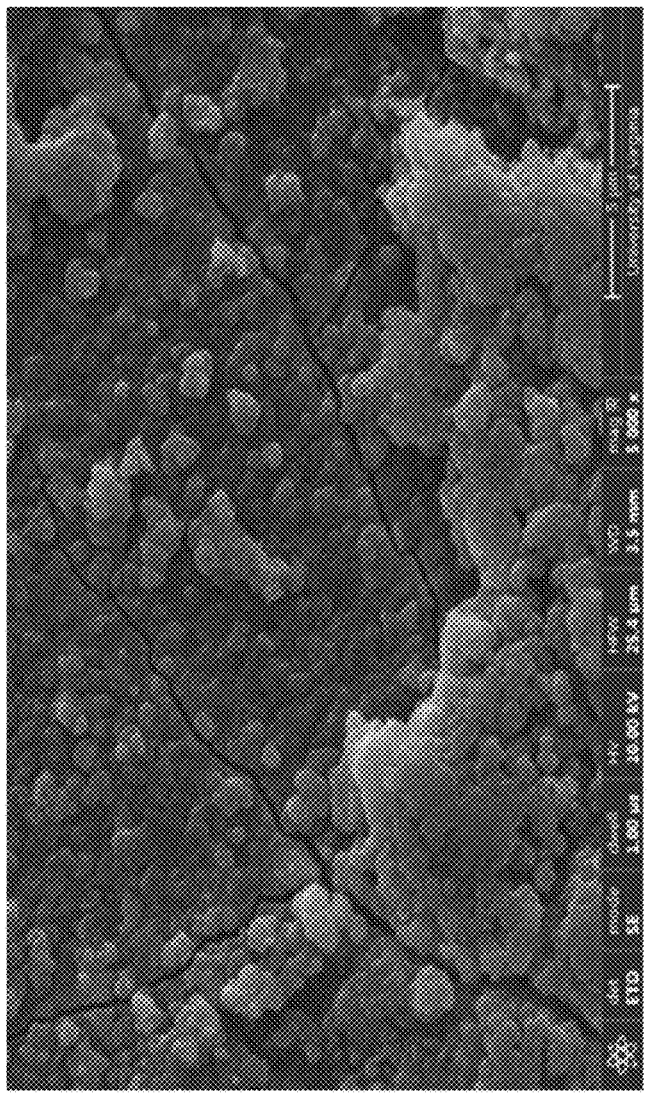
FIG. 6A is a scanning electron micrograph pertaining to an UiO-66 ($NH_2$) MOF applied on polyethersulfone in accordance with embodiments described herein.
Figure 6B:
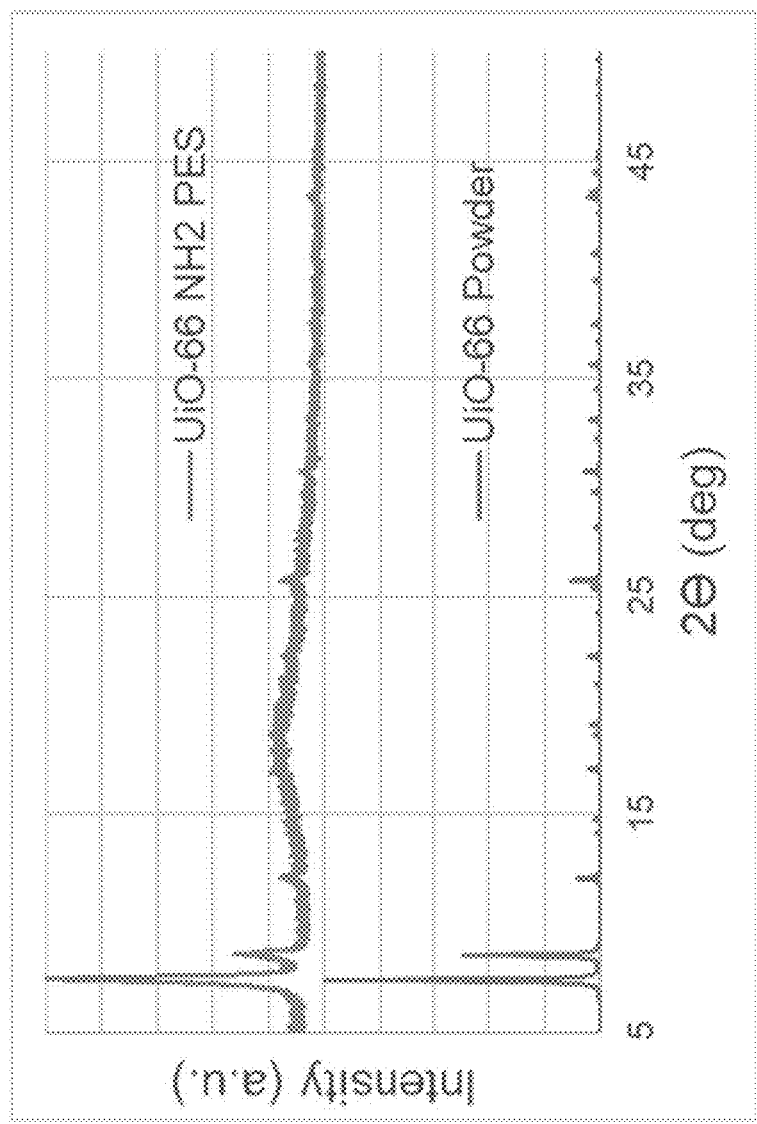
FIG. 6B is X-ray diffraction data pertaining to an UiO-66 ($NH_2$) MOF applied on polyethersulfone in accordance with embodiments described herein.
Figure 6C:
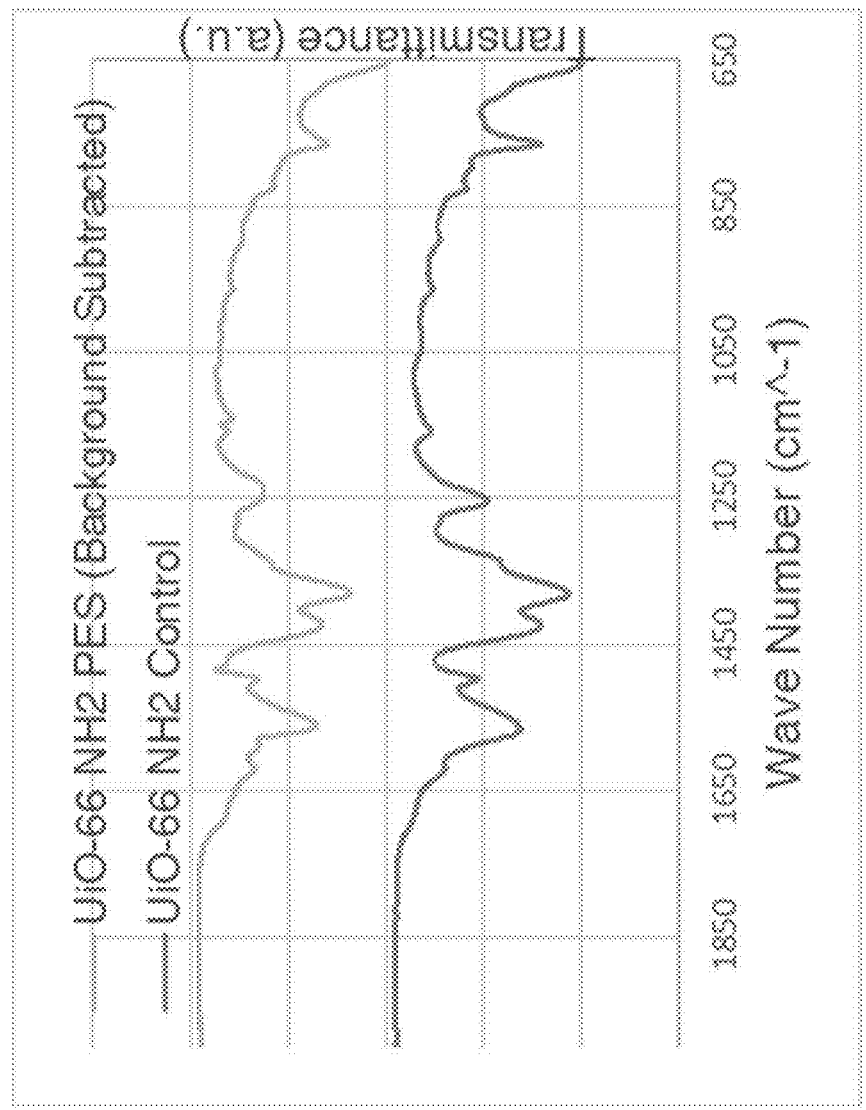
FIG. 6C is Fourier Transform Infrared Spectroscopy data pertaining to an UiO-66 ($NH_2$) MOF applied on polyethersulfone in accordance with embodiments described herein.
Figure 7:
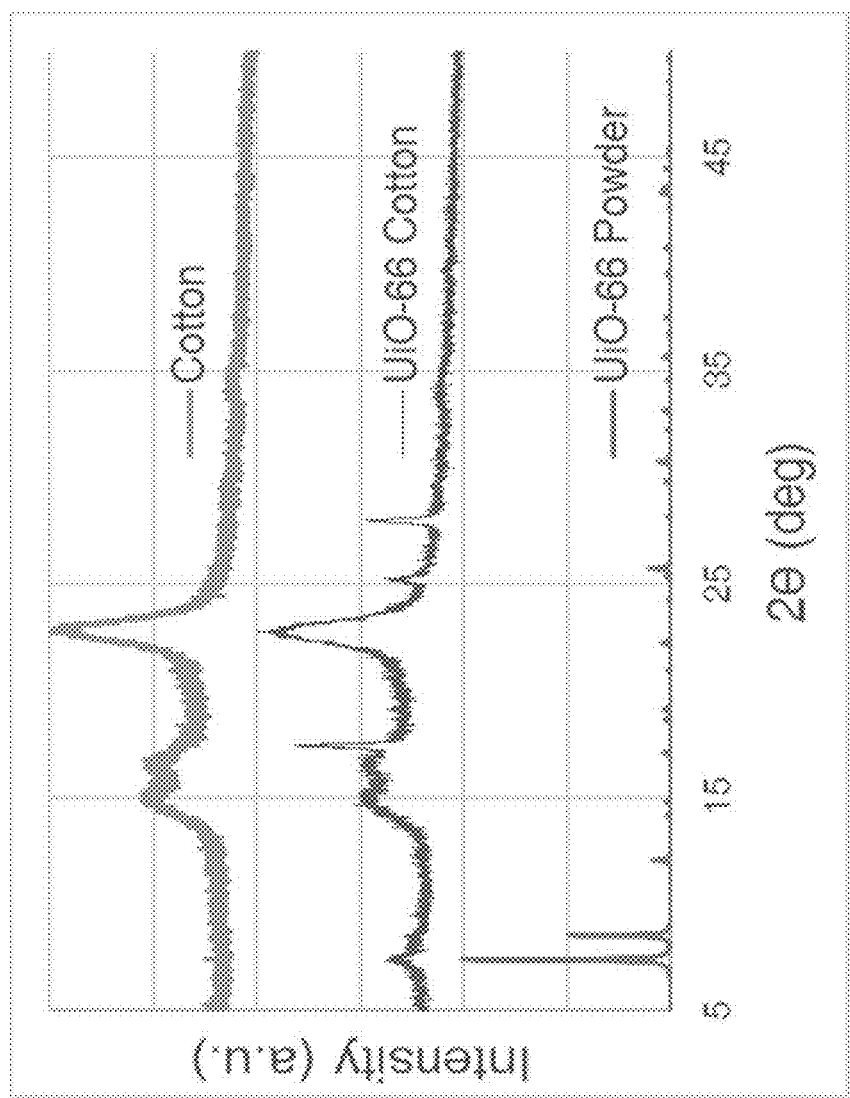
FIG. 7 is X-ray diffraction data pertaining to an UiO-66 ($NH_2$) MOF applied on cotton in accordance with embodiments described herein.
Figure 8A:
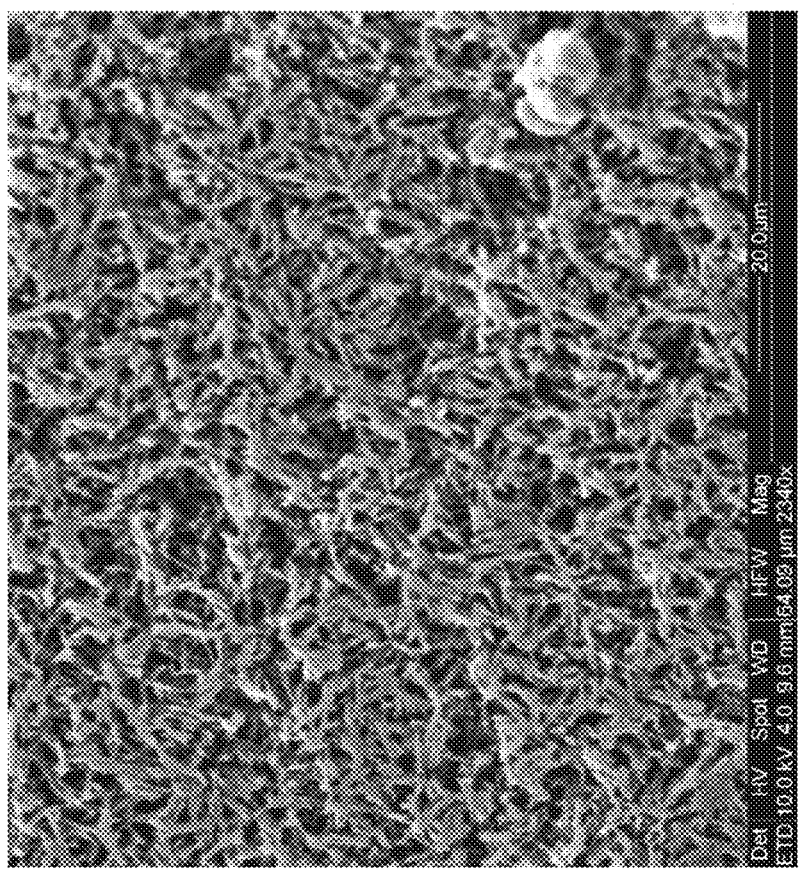
FIG. 8A is a scanning electron micrograph pertaining to an HKUST-1 MOF rapidly synthesized in the bulk in accordance with embodiments described herein.
Figure 8B:
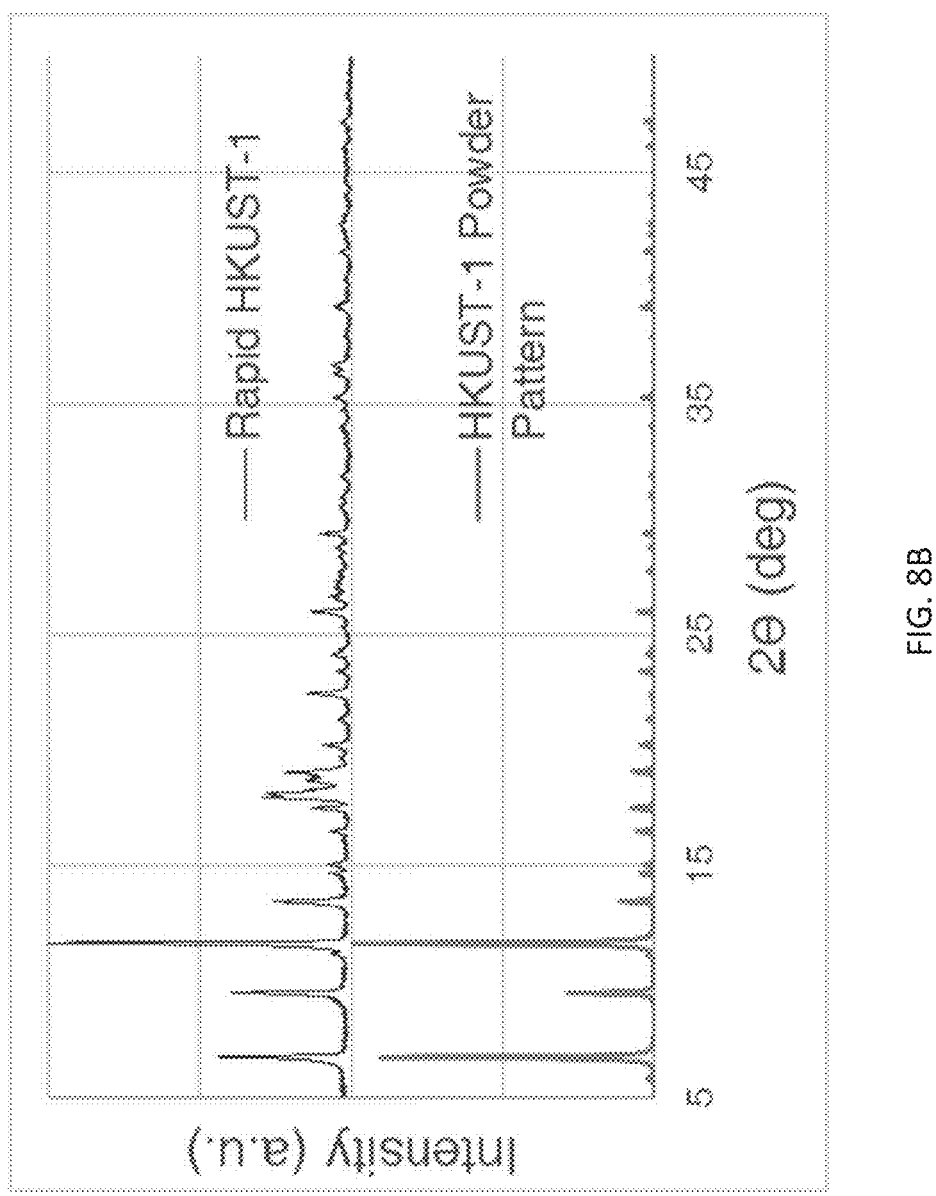
FIG. 8B is X-ray diffraction data pertaining to an HKUST-1 MOF made in accordance with embodiments described herein.
Figure 9A:
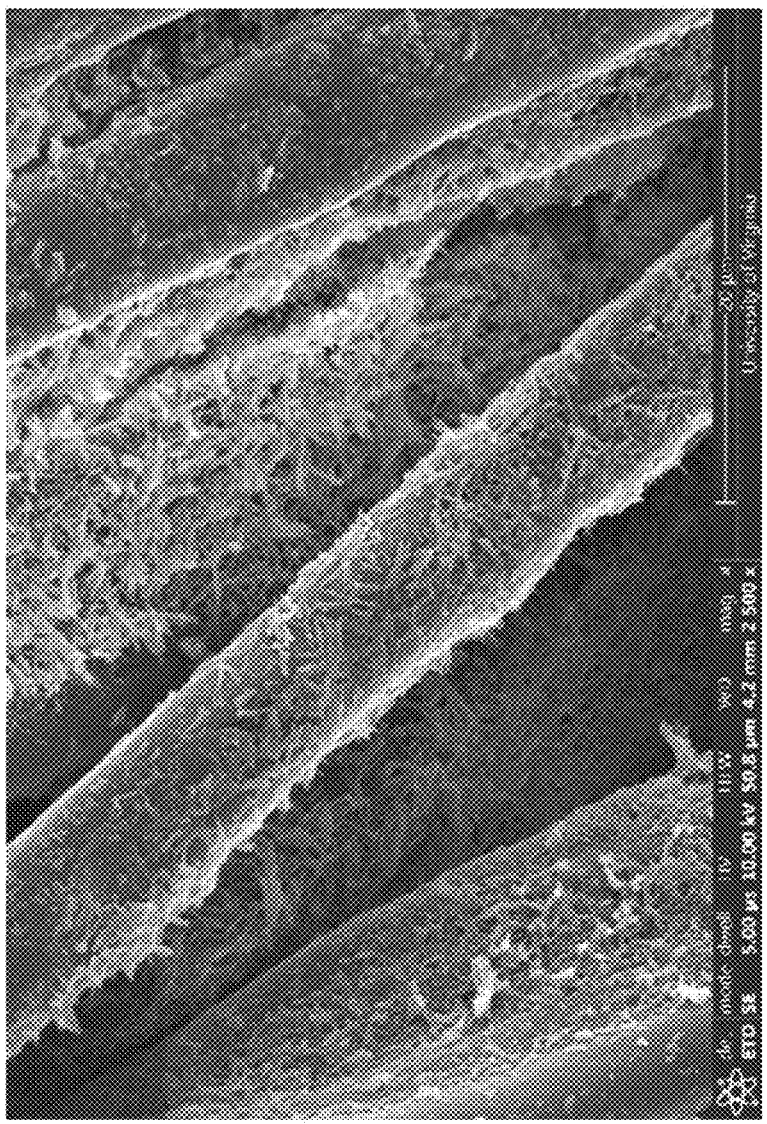
FIG. 9A is a scanning electron micrograph pertaining to an HKUST-1 MOF applied on 100% cotton in accordance with embodiments described herein.
Figure 9B:
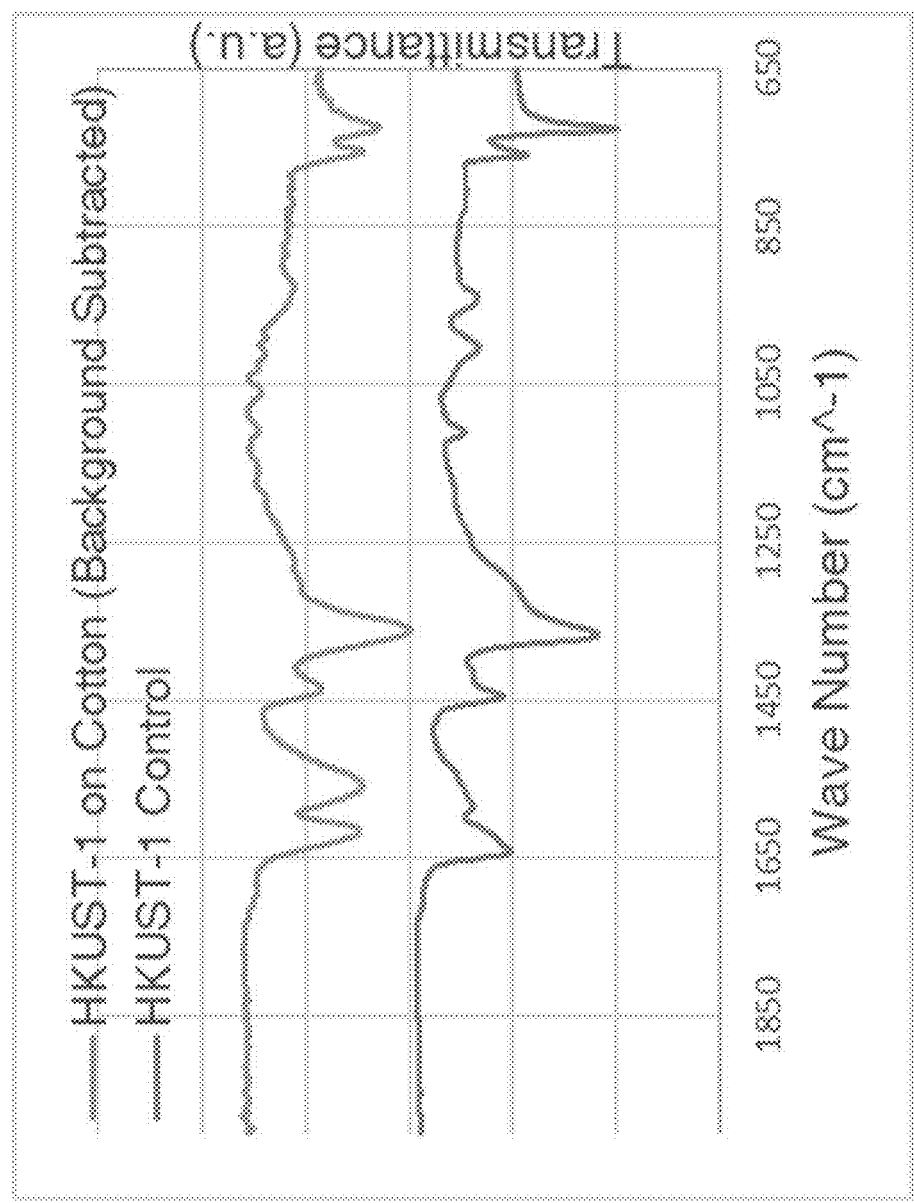
FIG. 9B is Fourier Transform Infrared Spectroscopy data pertaining to an HKUST-1 MOF applied on 100% cotton in accordance with embodiments described herein.
Figure 10A:
FIG. 10A is a scanning electron micrograph pertaining to an HKUST-1 MOF applied on alpha cellulose in accordance with embodiments described herein.
Figure 10B:
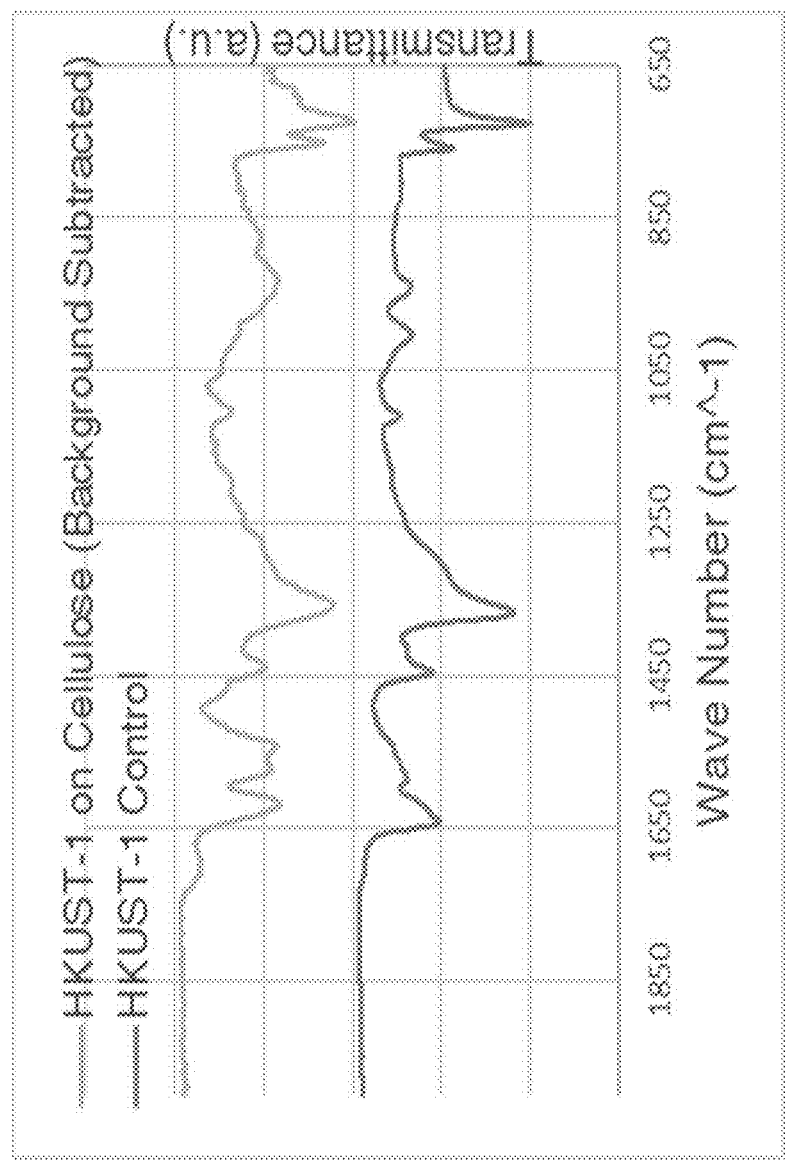
FIG. 10B is Fourier Transform Infrared Spectroscopy data pertaining to an HKUST-1 MOF applied on alpha cellulose in accordance with embodiments described herein.
Figure 11:
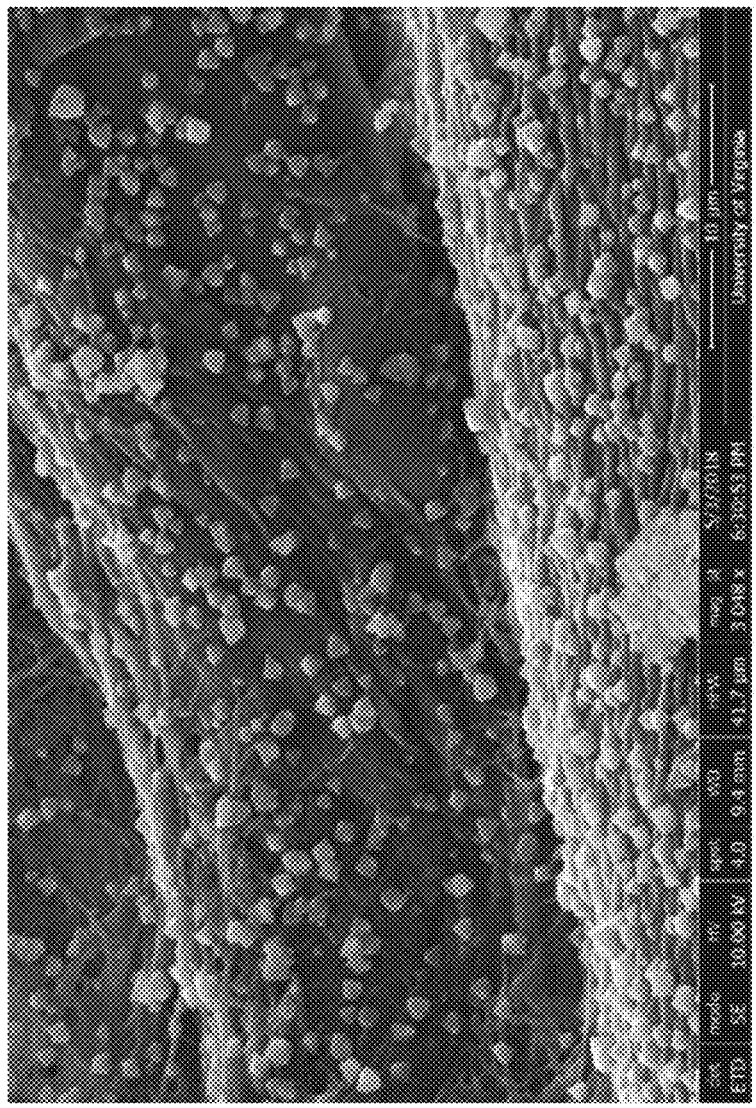
FIG. 11 is X-ray diffraction data pertaining to a UiO-66 ($NH_2$) MOF applied on 100% cotton in accordance with embodiments described herein.
Figure 12:
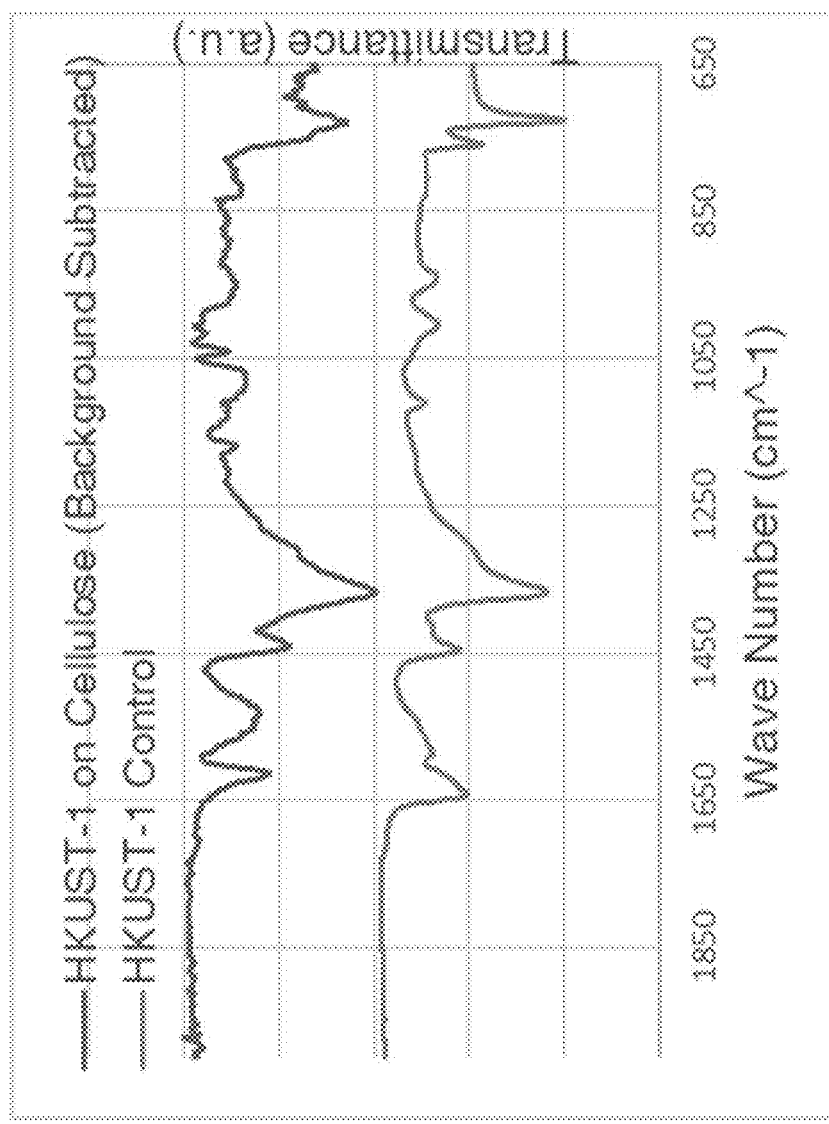
FIG. 12 is Fourier Transform Infrared Spectroscopy data to an HKUST-1 MOF applied on alpha cellulose in accordance with embodiments described herein.
Figure 13:
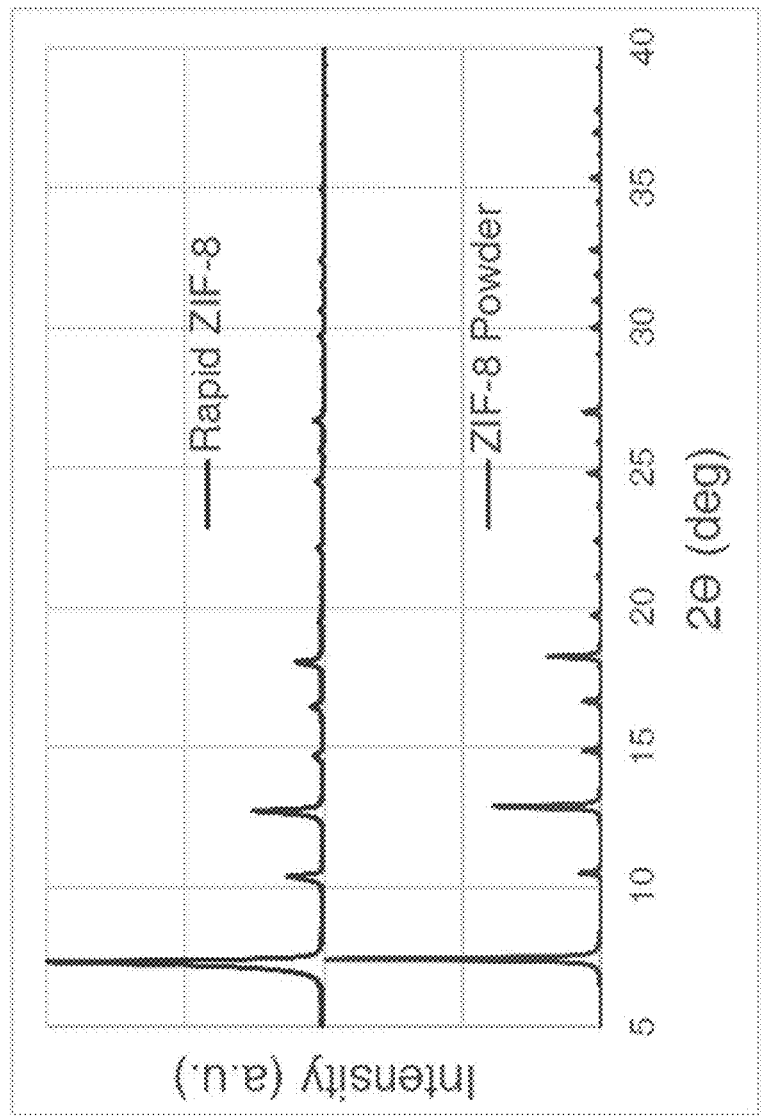
FIG. 13 is X-ray diffraction data pertaining to a ZIF-8 MOF made in accordance with embodiments described herein.
Figure 14:
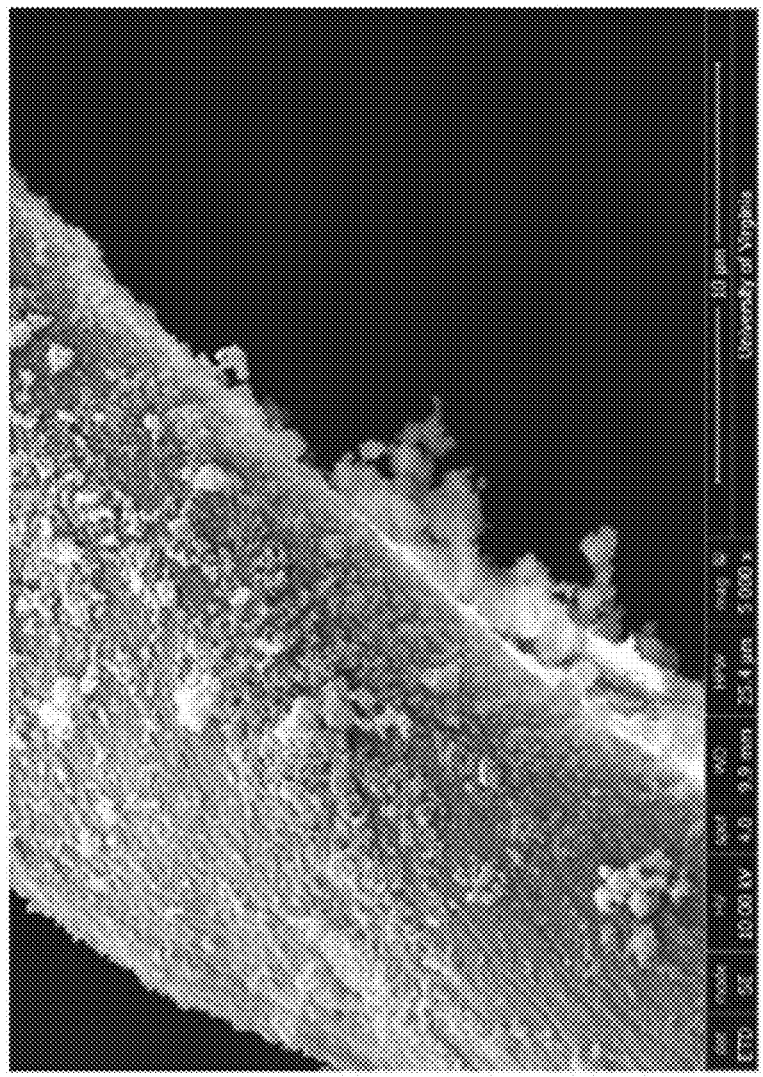
FIG. 14 is a scanning electron micrograph pertaining to a ZIF-8 MOF applied on 100% cotton in accordance with embodiments described herein.
Figure 15:
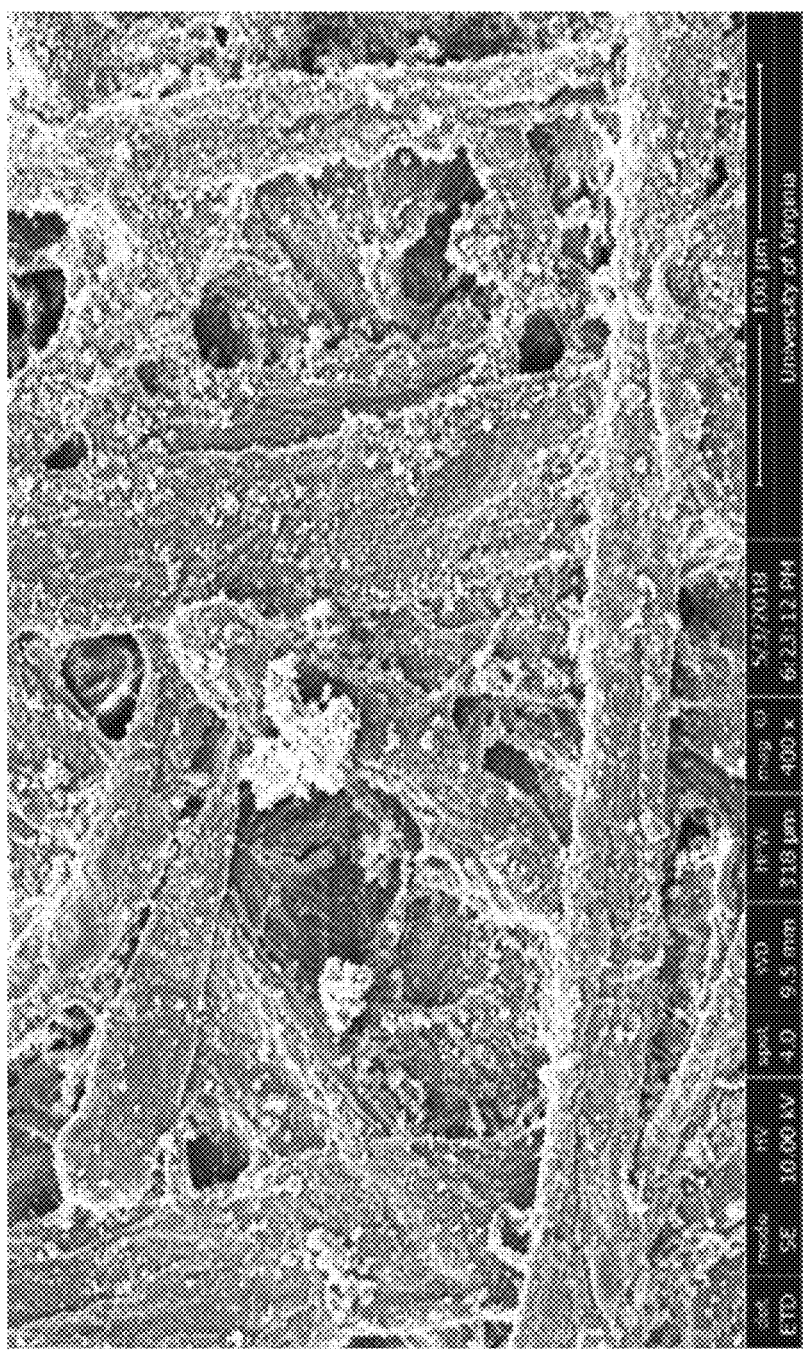
FIG. 15 is a scanning electron micrograph pertaining to a ZIF-8 MOF applied on alpha cellulose in accordance with embodiments described herein.
Figure 16:
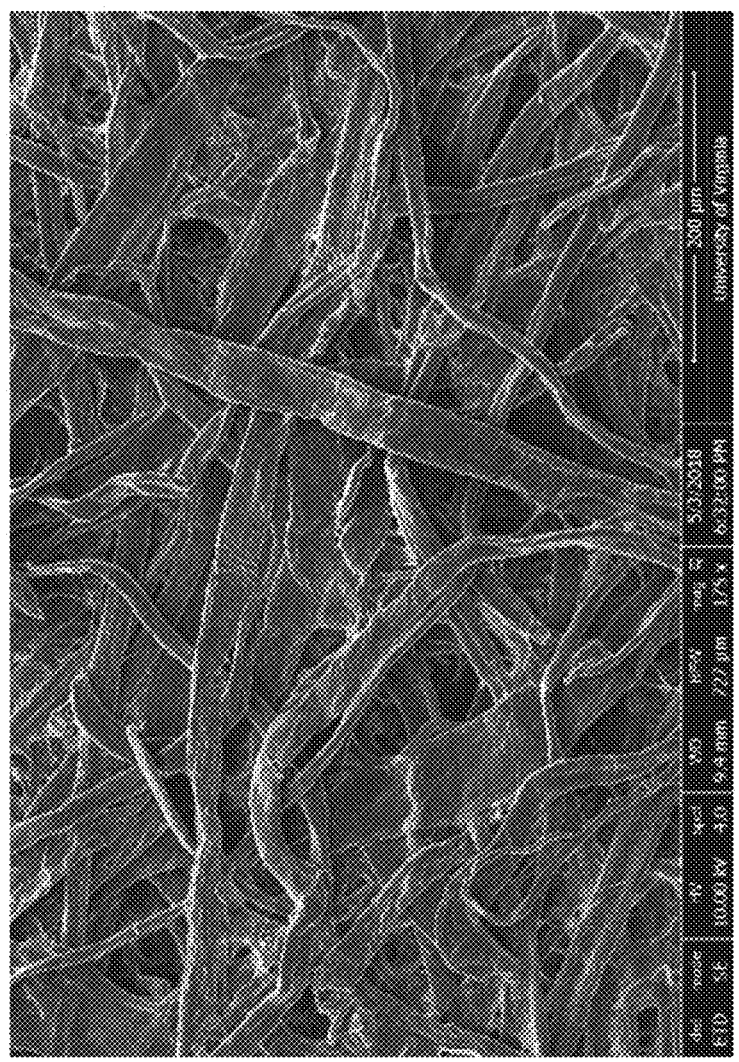
FIG. 16 is a scanning electron micrograph pertaining to an alpha cellulose substrate in accordance with embodiments described herein.
Figure 17:
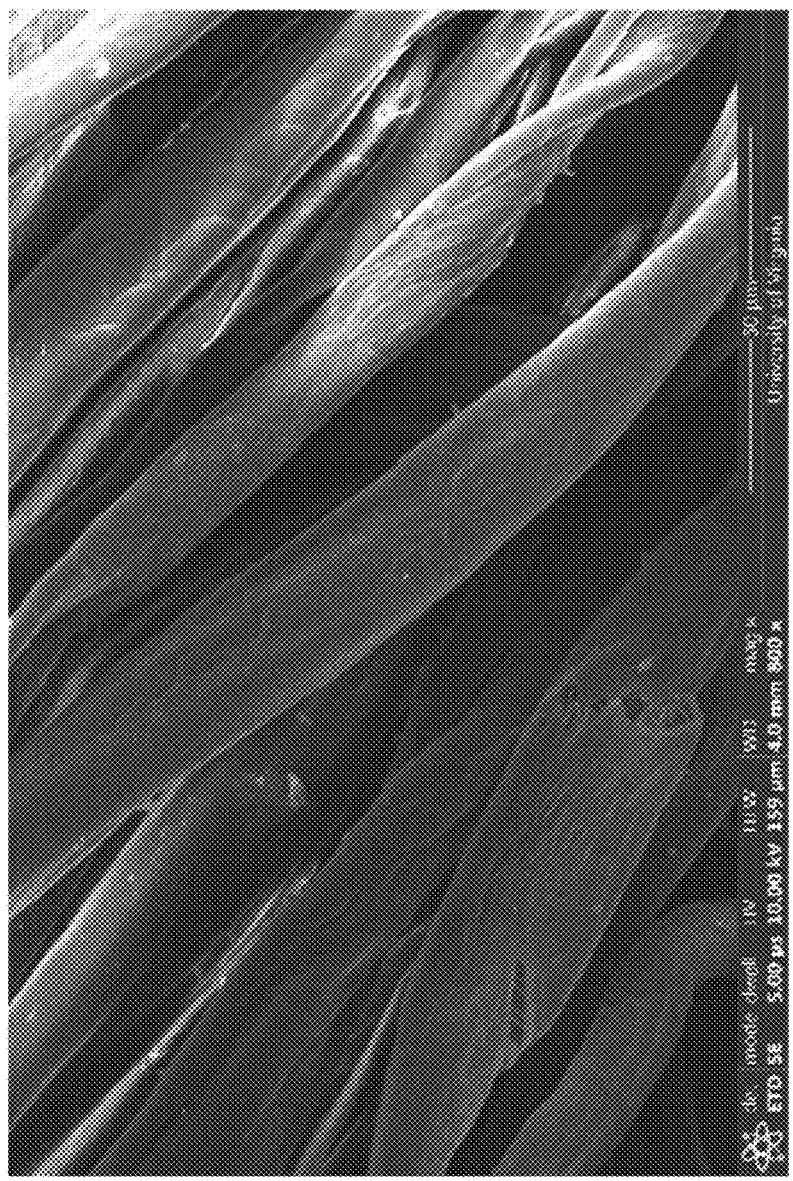
FIG. 17 is a scanning electron micrograph pertaining to cotton substrate in accordance with embodiments described herein.

| MOF | Coating Technique | Substrate | SEM | XRD | FTIR |
|---|---|---|---|---|---|
| UiO-66 ($NH_2$) | Bulk[3] | FIG. 1A | $N/D^2$ | FIG. 1B | $N/D^2$ |
| UiO-66 ($NH_2$) | Bulk[4] | $N/A^1$ | $N/D^2$ | FIG. 2 | $N/D^2$ |
| UiO-66 ($NH_2$) | Dip (5 dips)[3] | 100% Cotton | FIG. 3A | FIG. 3B | FIG. 3C |
| UiO-66 ($NH_2$) | Dip (5 dips)[5] | 100% Cotton | $N/D^2$ | FIG. 4 | $N/D^2$ |
| UiO-66 ($NH_2$) | Dip (5 dips)[3] | Alpha cellulose | $N/D^2$ | FIG. 5A | FIG. 5B |
| UiO-66 ($NH_2$) | Dip (5 dips)[3] | Polyethersulfone | FIG. 6A | FIG. 6B | FIG. 6C |
| UiO-66 | Dip (5 dips)[6] | 100% Cotton | $N/D^2$ | FIG. 7 | $N/D^2$ |
| HKUST-1 | Bulk | FIG. 8A | $N/D^2$ | FIG. 8B | $N/D^2$ |
| HKUST-1 | Dip (5 dips)[7] | 100% Cotton | FIG. 9A | $N/D^2$ | FIG. 9B |
| HKUST-1 | Dip (5 dips)[7] | Alpha cellulose | FIG. 10A | $N/D^2$ | FIG. 10B |
| HKUST-1 | Antisolvent | Alpha cellulose | FIG. 11 | $N/D^2$ | $N/D^2$ |
| HKUST-1 | Spray (5 passes) | Alpha cellulose | $N/D^2$ | $N/D^2$ | FIG. 12 |
| ZIF-8 | Bulk | $N/A^1$ | $N/D^2$ | FIG. 13 | $N/D^2$ |
| ZIF-8 | Dip (5 dips) | 100% Cotton | FIG. 14 | $N/D^2$ | $N/D^2$ |
| ZIF-8 | Dip (5 dips) | Alpha cellulose | FIG. 15 | $N/D^2$ | $N/D^2$ |
| None | $N/A^1$ | Alpha Cellulose | FIG. 16 | $N/D^2$ | $N/D^2$ |
| None | $N/A^1$ | 100% Cotton | FIG. 17 | $N/D^2$ | $N/D^2$ |

[1]N/A = Not available because either no substrate was coated or no MOF was added to the substrate.
[2]N/D = Not determined.
[3]15 mmol $NaHCO_3$ added to metal solution
[4]10 mmol ammonium acetate added to metal solution
[5]15 mmol $NaHCO_3$ added to metal solution and sonicated for 10 minutes
[6]20 mmol $NaHCO_3$ added to metal solution
[7]Linker solution adjusted to pH 10.5 with NaOH FIGS. 1A, 3A, 6A, 8A, 9A, 10A, 11, 14, 15, 16 and 17 show that textiles may be coated with MOFs in accordance with embodiments of the present invention. In contrast to the relatively smooth fibers shown in FIGS. 16 (alpha cellulose) and 17 (cotton), the uncoated fibers, the remaining SEM results show the MOFs coating the fibers, giving the fibers a textured appearance. FIGS. 1A and 8A show the MOFs in the bulk and may be compared to the SEM micrographs showing the MOFs coating the textiles.

FIG. 1A is an SEM micrograph of rapidly synthesized UiO-66 ($NH_2$).

FIG. 3A is an SEM micrograph of UiO-66 ($NH_2$) on cotton fabric after five (5) dips of the dip coating technique. Nanoparticles (white) are observed coating the fiber surface, indicating localized growth and attachment of MOF to the textile.

FIG. 6A is an SEM micrograph of UiO-66 ($NH_2$) on PES membrane after five (5) dips of the dip coating technique. Particles are observed completely coating the surface, indicating uniform and complete growth over the substrate.

FIG. 8A is an SEM micrograph of rapidly synthesized HKUST-1. Particles appear to be interconnected and needle-like.

FIG. 9A is an SEM micrograph of HKUST-1 on cotton fabric after five (5) dips of the dip coating technique. Particles (white) are observed coating the fiber surface indicating localized growth and attachment of MOF to the textile.

FIG. 10A is an SEM micrograph of HKUST-1 on alpha cellulose after five (5) dips of the dip coating technique. Nanoparticles (white) are observed coating the fiber surface and between fibers, indicating localized growth and attachment of MOF to within the confines of the textile fibers.

FIG. 11 is an SEM micrograph of HKUST-1 on alpha cellulose after five (5) dips of the antisolvent coating technique. Octahedral particles (white) are observed uniformly coating the fiber surface and between fibers, indicating localized growth and attachment of MOF to the textile fibers.

FIG. 14 is an SEM micrograph of ZIF-8 on cotton textile after five (5) dips of the dip coating technique. Particles (white) are observed coating the fiber surface, indicating localized growth and attachment of MOF to the textile.

FIG. 15 is an SEM micrograph of ZIF-8 on alpha cellulose after five (5) dips of the dip coating technique. Particles (white) are observed coating the fiber surface, indicating localized growth and attachment of MOF to the textile.

FIGS. 1B, 2, 3B, 4, 5A, 6B, 7, 8B, and 13 show that the XRD patterns match that of the control simulated patterns from known single crystal diffraction of the MOFs, and the presence of extra peaks can be attributed to the presence of the textile. FIG. 7 shows that the MOF stays on the fabric even after 10 minutes of sonication, as indicated by the peaks at 2θ of about 7 and about 9.

FIGS. 3C, 5B, 6C, 9B, 10B, and 12 show that the FTIR patterns match the patterns of the control, bulk nucleated MOF powders, after the substrate peaks have been subtracted as the background. Therefore, FTIR also indicates the rapid formation of MOFs on the various substrates.

Evidence of Rapid MOF Formation

Experiments were performed in which certain reaction conditions were varied to provide suboptimal MOF formation. For instance, four separate batches of UiO-66 ($NH_2$) were prepared substantially as described above. Batch A included bicarbonate to adjust the pH of the mixture of the metal solution and the linker solution. Batch B included ammonium acetate for the same purpose. Batch C did not include an agent to control the pH of the mixture. Likewise batch D did not include the agent to control the pH but was allowed to stir for 1 hour.

Figure 18:
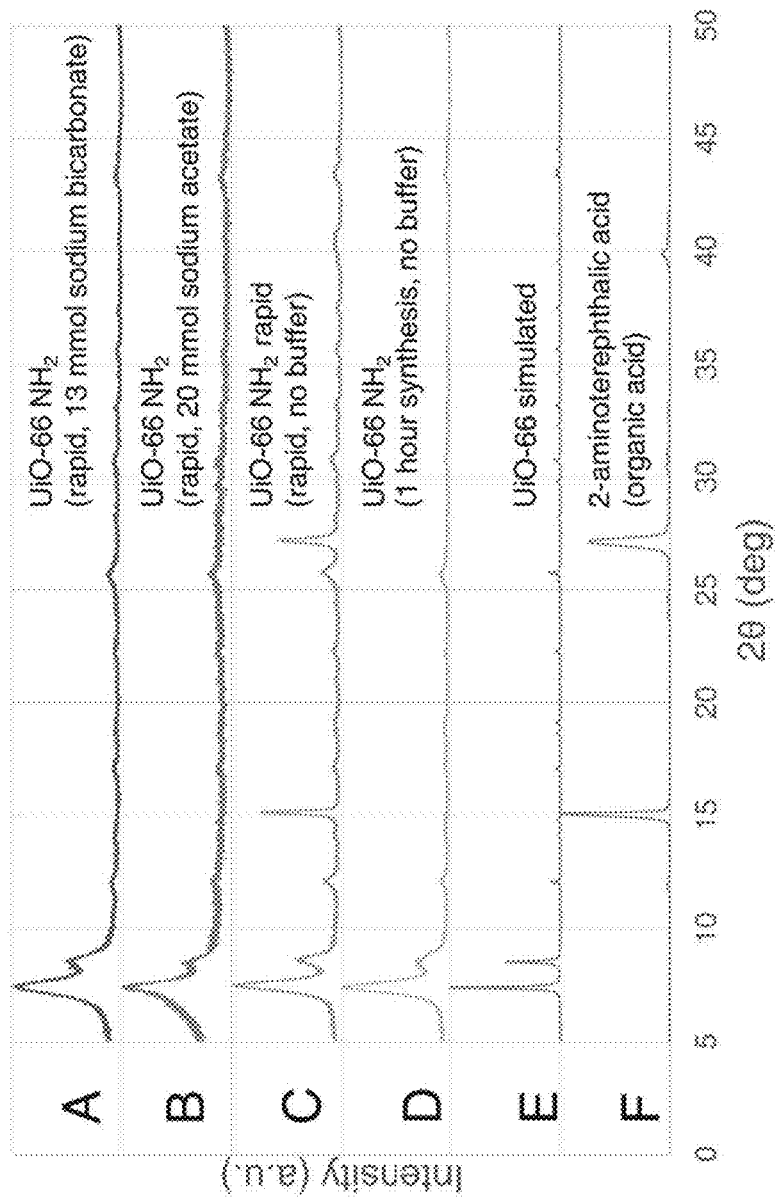
FIG. 18 is X-ray diffraction data pertaining to UiO-66 (NH$_2$) obtained under varying reaction conditions and times.

FIG. 18 provides the XRD data from this experiment. In FIG. 18, XRD traces are labeled in accordance with the batches identified above. Additionally, E represents a published powder pattern of UiO-66 and F represents XRD data from the pure organic acid linker. As shown in FIG. 18, batches A and B provide rapid formation of UiO-66 ($NH_2$), as evidenced by the peaks at 2θ of about 7.5 and 8.5. These same peaks also appear in the trace for batch D. However, batch C, which neither contained a pH-controlling agent nor was allowed to react for an extended period, included the peaks related to MOF formation. The peaks appearing in trace C at 2θ of about 15 and 27 correspond to precipitation of the organic acid linker also appearing in trace F. Therefore, failure to modulate the pH of the mixture of the metal solution and the linker solution leads to a smaller concentration of linker available for MOF formation, and thus MOF formation will require additional time without the pH-controlling agent.

Figure 19:
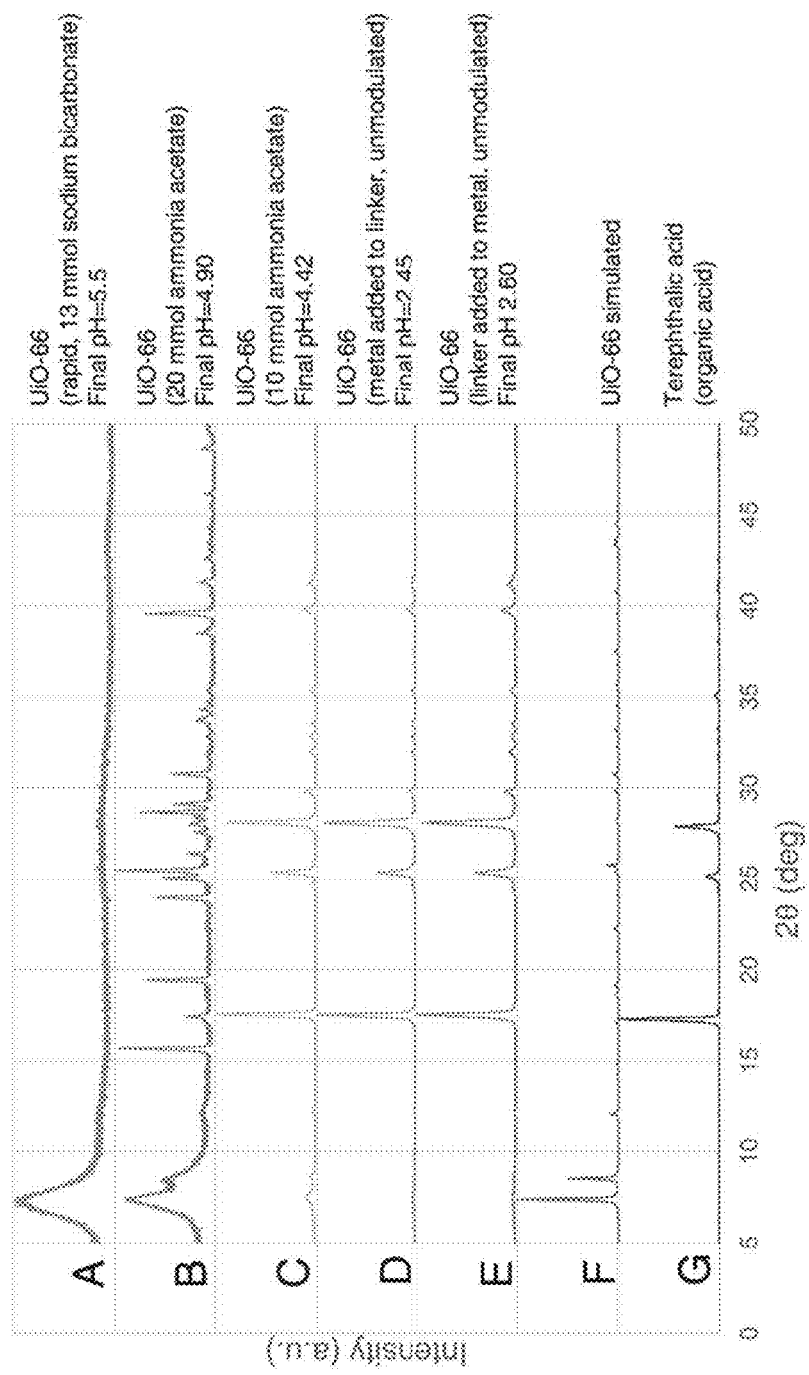
FIG. 19 is X-ray diffraction data pertaining to UiO-66 obtained under varying reaction conditions and times.

FIG. 19 provides similar XRD data for UiO-66 formation. Trace A corresponds to rapid UiO-66 formation in the presence of 13 mmol $NaHCO_3$ (pH=5.5). Trace B corresponds to rapid UiO-66 formation in the presence of 20 mmol ammonium acetate (pH=4.9). Trace C corresponds to rapid UiO-66 formation in the presence of 10 mmol ammonium acetate (pH=4.42). Traces D and E correspond to experiments where no base was added to the final mixture, with the experiment of trace D involving adding the metal to the linker, resulting in a pH of 2.45, and the experiment of trace E involving adding the linker to the metal, resulting in a pH of 2.6. Trace F is a simulated XRD trace for UiO-66 and trace G corresponds to the pure organic acid linker.

As shown in FIG. 19, the presence of an appropriate concentration of base drives the rapid formation of MOFs. In comparison with trace F, traces A and B include peaks at 2θ of about 7.5 and 8.5, which correspond to MOF formation. However, when too little base is used (trace C) and when no base is used (traces D and E), the MOF is not readily formed. Instead, peaks at 2θ of about 17.5, 26, and 28 suggest the presence of undissolved organic acid linker corresponding to peaks found in the pure organic acid (trace G).

Figure 20:
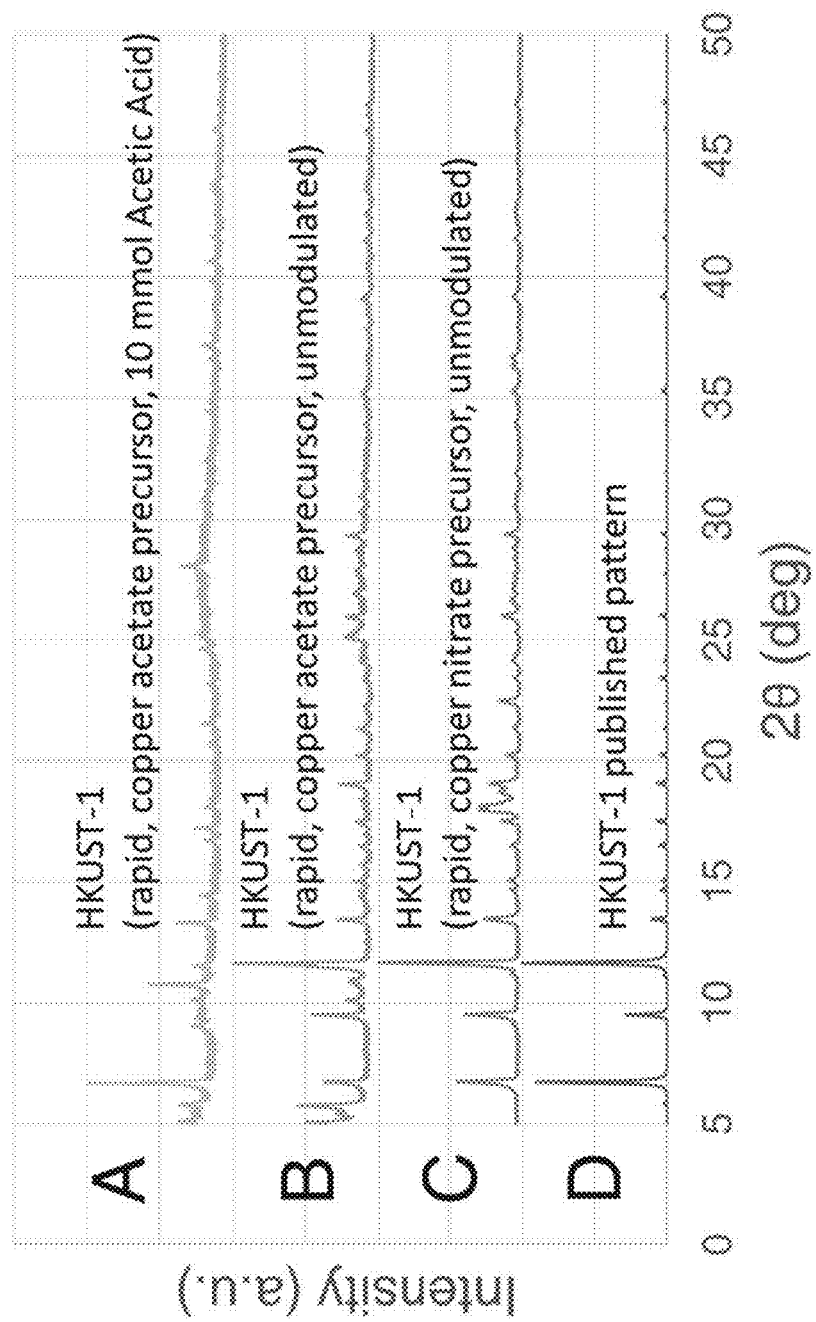
FIG. 20 is X-ray diffraction data pertaining to HKUST-1 obtained under varying reaction conditions and times.

FIG. 20 provides similar XRD data for HKUST-1. Trace A corresponds to MOF formation where copper acetate was used as the metal salt and where 10 mmol of acetic acid were added to the solution. Trace B corresponds to MOF formation where copper acetate was used as the metal salt, but no acetic acid is added. Trace C corresponds to MOF formation where copper nitrate was used as the metal salt. Trace D represents the published XRD data for HKUST-1.

Without intending to be bound by theory, it is believed that the acetic acid present in the solution relating to trace A causes precipitation of the organic acid linker thereby inhibiting MOF formation. A lesser corresponding effect is also seen in trace B, likely related to slightly acidic conditions caused by the acetate counterions from the copper metal. Trace C shows pure crystalline HKUST-1.

Figure 21:
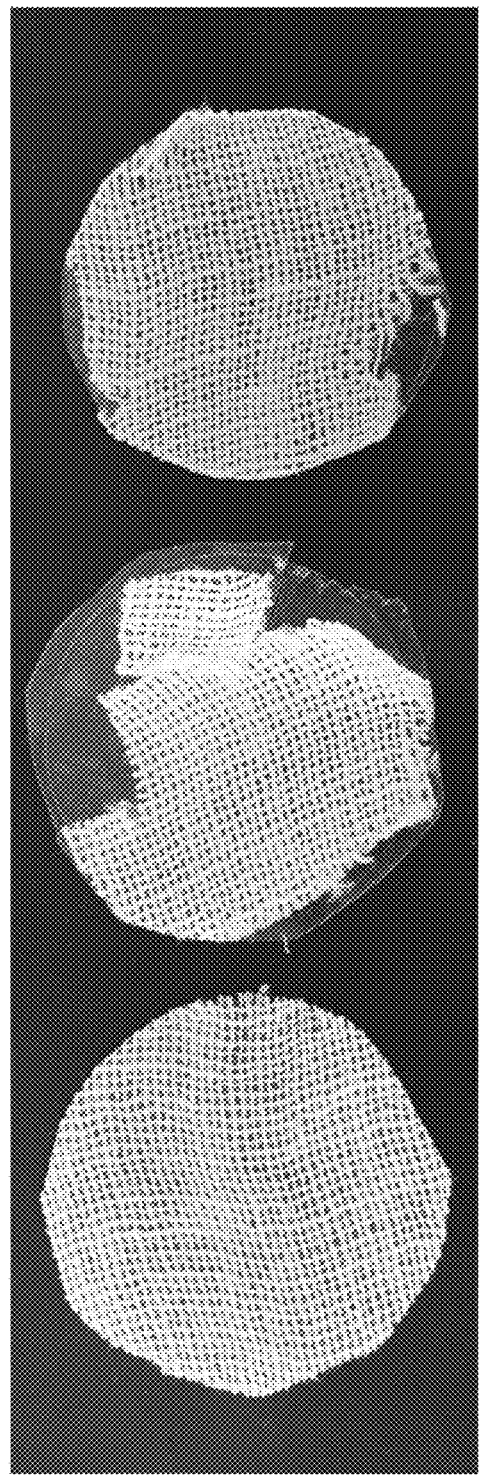
FIG. 21 is a photograph of 100% cotton coated with MOFs in accordance with embodiments described herein.
Figure 22:
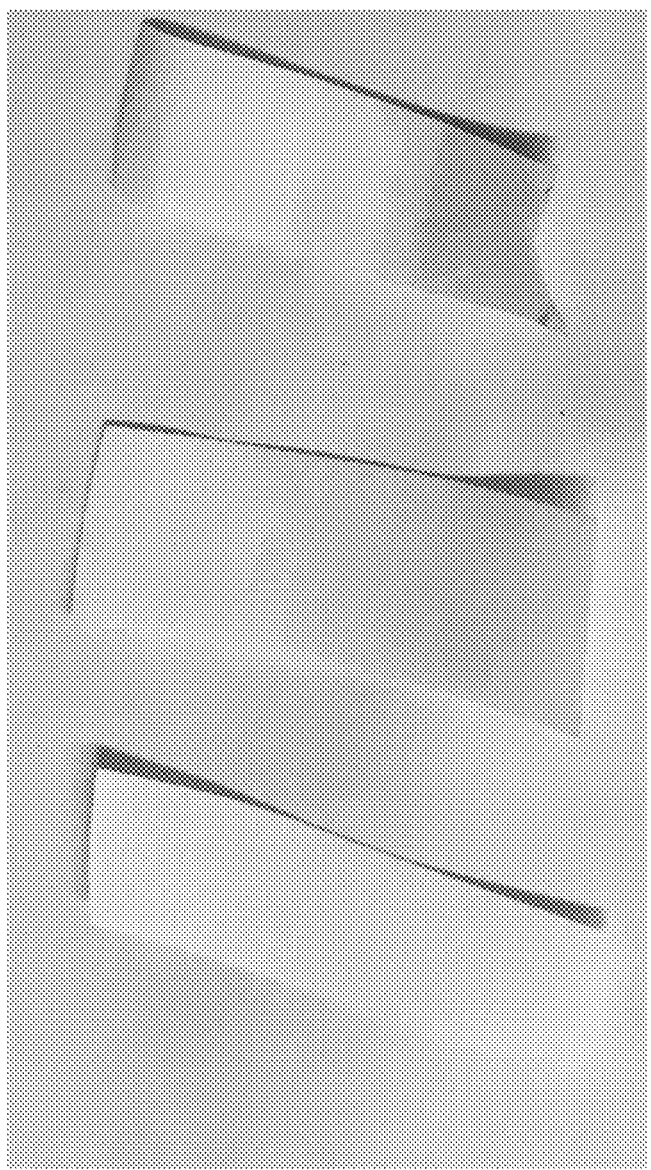
FIG. 22 is a photograph of alpha cellulose coated with MOFs in accordance with embodiments described herein.

FIGS. 21 and 22 show textiles that have been coated with MOFs. FIG. 21 is a photograph of bulk MOF samples dip-coated onto 100% cotton fabric. A is 100% cotton, B is 100% cotton fabric with a 5-dip UiO-66 ($NH_2$) treatment, providing a yellow-tinted cotton sample, and C is 100% cotton fabric with a 5-dip HKUST-1 treatment, providing a blue-tinted cotton sample. Similarly, FIG. 22 is a photograph of bulk MOF samples dip-coated onto alpha cellulose. A is alpha cellulose, B is alpha cellulose with a 5-dip UiO-66 ($NH_2$) treatment, providing a yellow-tinted cotton sample, and C is alpha cellulose with a 5-dip HKUST-1 treatment, providing a blue-tinted cotton sample.

Embodiments of the present invention may provide many advantages over the state-of-the-art. For instance, embodiments of the present invention allow for rapid growth of MOFs, on the order of seconds, on a wide range of materials at room temperature. Additionally, embodiments may be widely applicable to an array of different materials, including but not limited to, cotton, bamboo, hemp, wool, cellulose, among many others. Embodiments of this invention confine the MOFs to the surface of the substrate, or just below the surface, and thus provide higher levels of attachment to the substrate relative to traditional coating methods. Yet another advantage of certain embodiments of the invention is that minimal synthetic steps are required, as are relatively simple reaction conditions. Contrasted with traditional techniques, many of which require elevated temperatures and pressures, embodiments of this invention are more readily adaptable to large-scale commercial production.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A method of synthesis of metal organic frameworks ("MOFs"), the method comprising:
preparing a metal solution by dissolving at least one metal salt in an aqueous solution and buffering the metal solution to achieve a first pH, the metal solution optionally comprising an organic co-solvent;
preparing a linker solution by adding at least one organic acid linker and at least one base to an aqueous solution, wherein the at least one organic acid linker has an ability to be protonated or deprotonated in response to a second pH; and
mixing the metal solution and the linker solution to produce the MOFs, wherein the mixture of the metal solution and the linker solution has a third pH value, the third pH value being from 0.1 to 3 pH units greater than a highest $pK_a$ of the organic acid linker, wherein the MOFs are produced in less than 1 minute after the mixing of the metal solution and the linker solution.

2. The method of claim 1 wherein the at least one metal salt is selected from the group consisting of $ZrOCl_2$, $ZrCl_4$, $ZrBr_4$, $ZrI_4$, $ZrO(NO_3)_2$, $Zr(ClO_4)_4$ $Zr(SO_4)_2$, $Zr(PO_4)_4$ $ZrO(CH_3COO)_2$, $Zr(C_6H_5O_7)$ ("Zirconium citrate"), $Zr(CH_2C(CH_3)CO_2)_4$ ("Zirconium methacrylate"), $Zr(CH_2CHCO_2)_4$ ("Zirconium acrylate"), $Zr(OC_4H_9)_4$ ("Zirconium tertbutoxide"), $Zr(OCH_2CH_2CH_3)_4$ ("Zirconium (IV) propoxide"), $Zr_6O_4(OH)_4(CH_2C(CH_3)CO_2)_{12}$ ("Zirconium (IV) oxo hydroxy methacrylate"), $Cu(NO_3)_2$, CuCl, $CuCl_2$, CuBr, $CuBr_2$, CuI, $CuI_2$, $Cu(ClO_4)_2$, $CuSO_4$, $Cu_3(PO_4)_2$ $Cu(CH_3COO)$, $Cu_3(C_6H_5O_7)_2$ ("Copper citrate"), $Cu(CH_2C(CH_3)CO_2)_2$ ("Copper methacrylate"), $Cu(CH_2CHCO_2)_2$ ("Copper acrylate"), $Cu((CH_3)_2CHO)_2$ ("Copper propoxide"), $Zn(NO_3)_2$, $ZnCl_2$, $ZnBr_2$, $ZnI_2$, $Zn(ClO_4)_2$, $ZnSO_4$, $Zn_3(PO_4)_2$, $Zn(CH_3COO)$, $Zn_3(C_6H_5O_7)_2$ ("Zinc citrate"), $Zn(CH_2C(CH_3)CO_2)_2$ ("Zinc methacrylate"), $Zn(CH_2CHCO_2)_2$ ("Zinc acrylate"), $Zn(OCH_2CH_2CH_3)_2$ ("Zinc propoxide"), $AlCl_3$, $AlBr_3$, $AlI_3$, $Al(NO_3)_3$, $Al(ClO_4)_3$, $Al_2(SO_4)_3$, $AlPO_4$, $Al(CH_3COO)_3$, $Al(C_6H_5O_7)$ ("Aluminum citrate"), $Al(CH_2C(CH_3)CO_2)_3$ ("Aluminum methacrylate"), $Al(CH_2CHCO_2)_3$ ("Aluminum acrylate"), $Al((CH_3)_2CHO)_3$ ("Aluminum propoxide"), $FeCl_2$, $FeCl_3$, FeBr₃, FeI₂, Fe(NO₃)₂, FeSO₄, Fe₂(SO₄)₃, FePO₄, Fe(ClO₄)₂, Fe(CH₃COO)₂, Fe(C₆H₅O₇) ("Iron citrate"), Fe(CH₂C(CH₃)CO₂)₃ ("Iron methacrylate"), Fe(CH₂CHCO₂)₃ ("Iron acrylate"), Fe((CH₃)₂CHO)₃ ("Iron propoxide"), TiCl₂, TiCl₃, TiCl₄, TiBr₄, TiI₄, Ti(NO₃)₄, Ti(ClO₄)₄, Ti(SO₄)₂, Ti₃(PO₄)₄, Ti(CH₃COO)₄, Ti(C₆H₅O₇) ("Titanium citrate"), Ti(CH₂C(CH₃)CO₂)₄ ("Titanium methacrylate"), Ti(CH₂CHCO₂)₄ ("Titanium acrylate"), Ti((CH₃)₂CHO)₄ ("Titanium propoxide"), MgCl₂, MgBr₂, MgI₂, Mg(NO₃)₂, Mg(SO₄), Mg(PO₄)₂, Mg(ClO₄)₂, Mg(CH₃COO)₂, Mg(C₆H₅O₇) ("Magnesium citrate"), Mg(CH₂C(CH₃)CO₂)₂ ("Magnesium methacrylate"), Mg(CH₂CHCO₂)₂ ("Magnesium acrylate"), Mg((CH₃)₂CHO)₂ ("Magnesium propoxide"), HfCl₄, HfBr₄, HfI₄, Hf(NO₃)₄, Hf(SO₄)₂, Hf₃(PO₄)₄, Hf(CH₃COO)₄, Hf(C₆H₅O₇) ("Hafnium citrate"), Hf(CH₂C(CH₃)CO₂)₄ ("Hafnium methacrylate"), Hf(CH₂CHCO₂)₄ ("Hafnium acrylate"), Hf((CH₃)₂CHO)₄ ("Hafnium propoxide"), CoCl₂, CoCl₃, CoBr₂, CoI₂, Co(NO₃)₂, Co(ClO₄)₂, Co(SO₄), Co(CH₃COO), Co(CH₂C(CH₃)CO₂)₂ ("Cobalt methacrylate"), Co(CH₂CHCO₂)₂ ("Cobalt acrylate"), and Co((CH₃)₂CHO)₂ ("Cobalt propoxide").

3. The method of claim 1 wherein the at least one organic acid linker is selected from the group consisting of a substituted or unsubstituted straight-chain or branched dicarboxylic acid having at least three carbon atoms and saturated and/or unsaturated C—C bonds, formula (I), formula (II), formula (III), and any combination thereof:

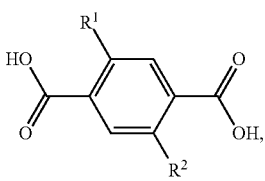

(I)

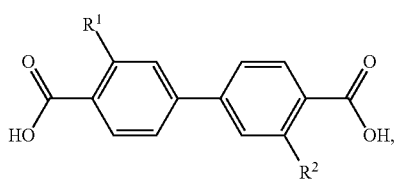

(II)

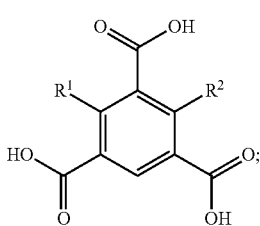

(III)

wherein

R1 and R2 are the same or different and are selected from the group consisting of hydrogen, amino, sulfo, hydroxo, carboxyl, methyl, ethyl, propyl, butyl, pentyl, hexyl, heptyl, octyl, nonyl, phosphono, trifluoromethyl, trichloromethyl, and tribromomethyl.

4. The method of claim 1 wherein the at least one organic acid linker is selected from the group consisting of formula (IV), formula (V), and any combination thereof:

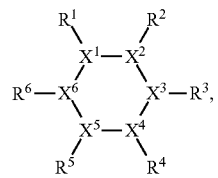

(IV)

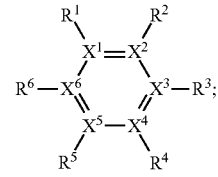

(V)

wherein

X1, X2, X3, X4, X5, and X6 are the same or different and are selected from the group consisting of C and N;

R1, R2, R3, R4, R5, and R6 are the same or different and are selected from the group consisting of hydrogen, amino, sulfo, hydroxo, carboxyl, methyl, ethyl, propyl, butyl, pentyl, hexyl, heptyl, octyl, nonyl, phosphono, trifluoromethyl, trichloromethyl, tribromomethyl, 4-(carboxyphenol) benzyl, substituted or unsubstituted benzyl, and substituted or unsubstituted biphenyl; and the at least one organic acid linker comprises at least two carboxyl groups.

5. The method of claim 1 wherein the organic acid linker is selected from the group consisting of terephthalic acid, 2-hydroxyterephthalic acid, 2,5-dihydroxyterephthalic acid, 2-aminoterephthalic acid, 2,5-diaminoterephthalic acid, 2-sulfoterephthalic acid, 2,5-disulfoterephthalic acid, 2-methylterephthalic acid, 2,5-methylterephthalic acid, 2-phosphonoterephtahlic acid, 2,5-diphosphonoterephthalic acid, cyclohexane-1,2,4,-tricarboxylic acid, 1,2,4,5-benzenetetracarboxylic acid, cyclohexane-1,2,4,5-tetracarboxylic acid, fumaric acid, 1,4-naphthalenedicarboxylic acid, biphenyl-4,4'-dicarboxylic acid, 2-amino-4,4'-biphenyldicarboxylic acid, 2-sulfo-4,4'-biphenyldicarboxylic acid, trimesic acid, 1,3,5-cyclohexanetricarboxylic acid, 2-methylimidazole, benzimidazole, 1,3,5-benzenetrisulfonic acid, 1,4-benzenedisulfonic acid, tetraethyl 4,4',4''',4'-(pyrene-1,3,6,8-tetrayl)tetrabenzoic acid.

6. The method of claim 1 wherein the organic acid linker is 2-aminoterephthalic acid.

7. The method of claim 1 wherein buffering the metal solution comprises adding ammonium acetate, sodium carbonate, sodium bicarbonate, dimethylamine, triethylamine, ammonium bicarbonate, disodium hydrogen phosphate, sodium chloride, sodium acetate, sodium citrate, sodium hydroxide, potassium hydroxide, potassium carbonate, potassium bicarbonate, calcium carbonate, calcium bicarbonate, or any combination thereof to the solution.

8. The method of claim 1, wherein the first pH is from greater than zero to 7, the second pH is from 5.5 to 12.5, and the third pH is from 4.6 to 8.

9. The method of claim 1 further comprising heating the metal solution at a temperature, and subsequently allowing the metal solution to cool to room temperature.

10. The method of claim 1 further comprising adding a weak organic acid to the metal solution.

11. The method of claim 1 further comprising adding an acid to the metal solution, the acid selected from the group consisting of acetic acid, glycine, sulfuric acid, fluoroacetic acid, difluoroacetic acid, trifluoroacetic acid, trichloroacetic acid, methacrylic acid, acrylic acid, propionic acid, and any combination thereof.

12. The method of claim 1 wherein the linker solution comprises a molar ratio of organic acid linker to base ranging from 1:30 to 1:0.5.

13. The method of claim 1, wherein the MOFs are selected from the group consisting of UiO-66, UiO-66 ($NH_2$), UiO-67, UiO-66 (COOH), UiO-68, HKUST-1, ZIF-8, ZIF-7, NU-901, NU-1000, and a combination thereof.

14. A method of coating textiles with metal organic frameworks ("MOFs"), the method comprising:
   preparing a metal solution by dissolving at least one metal salt in an aqueous solution and buffering the metal solution to achieve a first pH;
   preparing a linker solution by adding at least one organic acid linker and at least one base to an aqueous solution, wherein the linker solution has a second pH that is more basic than the first pH;
   mixing the metal solution and the linker solution to produce the MOFs in a mixed solution having a third pH value, the third pH value being from 0.1 to 3 pH units greater than a highest $pK_a$ of the organic acid linker, wherein the MOFs are produced in less than 1 minute after the mixing of the metal solution and the linker solution; and
   applying the MOFs to the textile to produce the textiles coated with MOFs.

15. The method of claim 14 wherein:
   the mixing of the metal solution and linker solution is performed prior to the applying of the MOFs to the textile; or
   the applying of the MOFs to the textile comprises first applying the metal solution to the textile and then applying the linker solution to the textile having the applied metal solution thereon.

16. The method of claim 14 wherein the applying of the MOFs to the textile comprises dip-coating or spray coating the textile.

17. The method of claim 14, wherein the MOFs are selected from the group consisting of UiO-66, UiO-66 ($NH_2$), UiO-67, UiO-66 (COOH), UiO-68, HKUST-1, ZIF-8, ZIF-7, NU-901, NU-1000, and a combination thereof.

\* \* \* \* \*